US010671547B2

(12) United States Patent
Koeberl et al.

(10) Patent No.: US 10,671,547 B2
(45) Date of Patent: Jun. 2, 2020

(54) LIGHTWEIGHT TRUSTED TASKS

(71) Applicants: Patrick Koeberl, Alsbach-Haenlein (DE); Steffen Schulz, Darmstadt (DE); Vedvyas Shanbhogue, Austin, TX (US); Jason W. Brandt, Austin, TX (US); Venkateswara R. Madduri, Austin, TX (US); Sang W. Kim, Austin, TX (US); Julien Carreno, Ennis (IE)

(72) Inventors: Patrick Koeberl, Alsbach-Haenlein (DE); Steffen Schulz, Darmstadt (DE); Vedvyas Shanbhogue, Austin, TX (US); Jason W. Brandt, Austin, TX (US); Venkateswara R. Madduri, Austin, TX (US); Sang W. Kim, Austin, TX (US); Julien Carreno, Ennis (IE)

(73) Assignee: Intel Corporation, Santa Clara, CA (US)

(*) Notice: Subject to any disclaimer, the term of this patent is extended or adjusted under 35 U.S.C. 154(b) by 638 days.

(21) Appl. No.: 15/384,267

(22) Filed: Dec. 19, 2016

(65) Prior Publication Data
US 2018/0173644 A1    Jun. 21, 2018

(51) Int. Cl.
G06F 12/14    (2006.01)
G06F 21/74    (2013.01)
(Continued)

(52) U.S. Cl.
CPC .......... *G06F 12/1416* (2013.01); *G06F 21/57* (2013.01); *G06F 21/74* (2013.01); *G06F 9/4401* (2013.01); *G06F 2212/1052* (2013.01)

(58) Field of Classification Search
CPC .. G06F 12/14; G06F 12/1416; G06F 12/1441; G06F 12/1483
See application file for complete search history.

(56) References Cited

U.S. PATENT DOCUMENTS 6,745,307 B2    6/2004    McKee
9,509,502 B2    11/2016   Schulz et al.
(Continued)

FOREIGN PATENT DOCUMENTS

EP      1378836 A2      1/2004
WO      2016153683 A1   9/2016

OTHER PUBLICATIONS

Asokan N., et al., "Mobile Trusted Computing," Proceedings of the IEEE, Aug. 2014, vol. 102 (8), pp. 1189-1206.
(Continued)

*Primary Examiner* — Than Nguyen
(74) *Attorney, Agent, or Firm* — Nicholson De Vos Webster & Elliott, LLP

(57) ABSTRACT

Methods and apparatus relating to lightweight trusted tasks are disclosed. In one embodiment, a processor includes a memory interface to a memory to store code, data, and stack segments for a lightweight-trusted task (LTT) mode task and for another task, a LTT control and status register including a lock bit, a processor core to enable LTT-mode, configure the LTT-mode task, and lock down the configuration by writing the lock bit, and a memory protection circuit to: receive a memory access request from the memory interface, the memory access request being associated with the other task, determine whether the memory access request is attempting to access a protected memory region of the LTT-mode task, and protect against the memory access request accessing the protected memory region of the LTT-mode task, regardless of a privilege level of the other task, and regardless of whether the other task is also a LTT-mode task.

16 Claims, 20 Drawing Sheets

(51) Int. Cl.
*G06F 21/57* (2013.01)
*G06F 9/4401* (2018.01)

(56) References Cited

U.S. PATENT DOCUMENTS

| | | |
|---|---|---|
| 2002/0147916 A1 | 10/2002 | Strongin et al. |
| 2005/0183072 A1 | 8/2005 | Horning et al. |
| 2006/0149911 A1 | 7/2006 | Kimelman et al. |
| 2007/0050580 A1 | 3/2007 | Lewis et al. |
| 2008/0244155 A1 | 10/2008 | Lee et al. |
| 2008/0276051 A1 | 11/2008 | Renno |
| 2009/0113141 A1 | 4/2009 | Bullman et al. |
| 2010/0044755 A1 | 2/2010 | Tsuda et al. |
| 2012/0215991 A1 | 8/2012 | Moyer |
| 2013/0263277 A1 | 10/2013 | Ely et al. |
| 2015/0032996 A1 | 1/2015 | Koeberl et al. |
| 2015/0263855 A1 | 9/2015 | Schulz et al. |
| 2016/0283402 A1* | 9/2016 | Schulz ................ G06F 12/145 |
| 2016/0306752 A1* | 10/2016 | Koeberl ............... G06F 9/3802 |
| 2018/0157603 A1* | 6/2018 | Schulz ................ G06F 12/145 |

OTHER PUBLICATIONS

Defrawy K.E., et al., "SMART: Secure and Minimal Architecture for (Establishing a Dynamic) Root of Trust," NDSS Symposium, Feb. 8, 2012, San Diego, 15 pages.
Koeberl P., et al., "TrustLite: A Security Architecture for Tiny Embedded Devices," Proceedings of Association for Computing Machinery EuroSys'14, Apr. 13-16, 2014, Amsterdam, Netherlands, 14 pages.
Non-Final office action from U.S. Appl. No. 14/666,087, dated Sep. 26, 2016, 36 pages.
Noorman J., et al., "Sancus: Low-cost Trustworthy Extensible Networked Devices with a Zero-software Trusted Computing Base," 22nd USENIX Security Symposium, USENIX Association, Aug. 14, 2013, pp. 479-494.
Notice of Allowance from U.S. Appl. No. 13/952,849, dated Dec. 14, 2015, 16 pages.
Notice of Allowance from U.S. Appl. No. 13/952,849, dated Mar. 29, 2016, 13 pages.
Notice of Allowance from U.S. Appl. No. 14/666,087, dated Mar. 17, 2017, 21 pages.

* cited by examiner

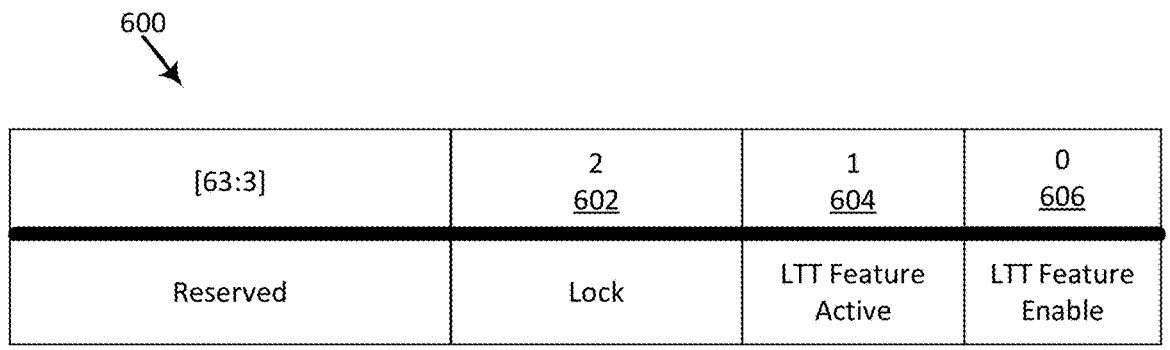

| [63:3] | 2<br>602 | 1<br>604 | 0<br>606 |
|---|---|---|---|
| Reserved | Lock | LTT Feature Active | LTT Feature Enable |

| Field | Access | Description |
|---|---|---|
| LTT Feature Enable<br>608 | Read/Write | When set enables Lightweight Trusted Tasks feature. |
| LTT Feature Active<br>610 | Read Only | When set indicates Lightweight Trusted Tasks feature is active.<br>Bit is Read-Only; ignore on write. |
| Lock<br>612 | Read/Write | When set further writes to all LTT control and status registers generate a fault. |
| Reserved<br>614 | Read Only | Reads return 0; Writes generate a fault. |

| 63:MAXPHYSADDRESS 902 | MAXPHYSADDRESS-1 : 12 904 | 11 906 | 10:0 908 |
|---|---|---|---|
| Reserved | Mask | Valid | Reserved |

| Field | Access | Description |
|---|---|---|
| Valid 910 | Read/Write | When set, contents of base and mask registers are valid. |
| Mask 912 | Read/Write | Defines the mask portion of the Range Register. |
| Reserved 914 | Read Only | Reads return 0; Writes generate a fault. |

FIG. 9

Root-of-Trust

FIG. 17
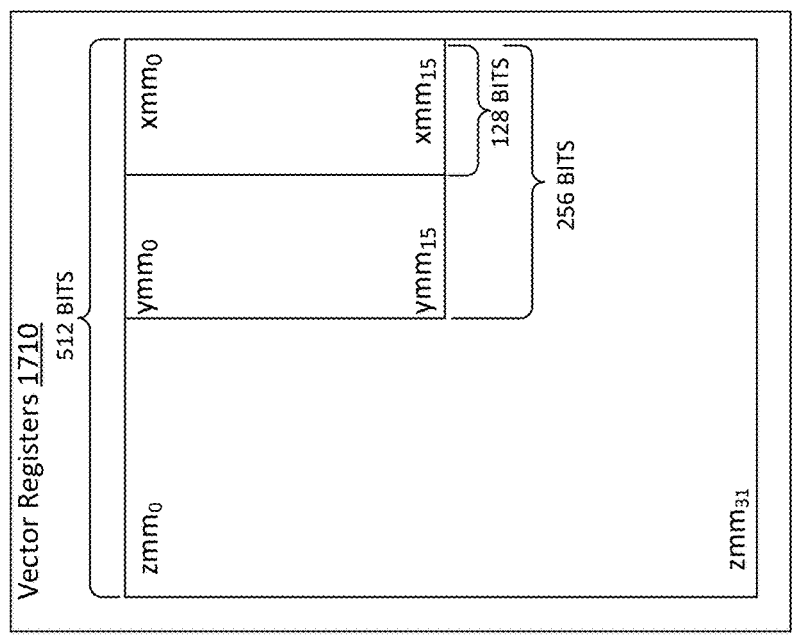
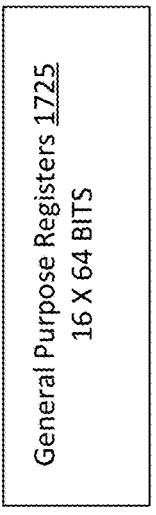

LIGHTWEIGHT TRUSTED TASKS

TECHNICAL FIELD

Embodiments described herein generally relate to a computing devices that face security threats during operation. Embodiments described generally relate computing devices that implement lightweight trusted tasks.

BACKGROUND INFORMATION

In computing, especially in the context of Internet of Things (IoT) and wearable technologies, computing devices benefit from operating within tight cost and energy budgets, while at the same time being resilient against security threats. Increasingly, the ability to execute code with strong security guarantees is recognized as a beneficial feature of IoT and wearable devices. As devices become connected and host multiple stakeholders, the traditional model of coarse-grained separation based on supervisor and user privileges (Ring 0/Ring 3), or in some cases simply trusting all code in the system, is no longer sufficient.

BRIEF DESCRIPTION OF THE DRAWINGS

The various advantages of the embodiments disclosed herein will become apparent to one skilled in the art by reading the following specification and appended claims, and by referencing the drawings, in which:

FIG. 6 shows a lightweight trusted tasks control and status register according to an embodiment;

FIG. 9 shows a protected memory region mask model-specific register according to an embodiment;

FIG. 17 is a block diagram of a register architecture 1700 according to one embodiment disclosed herein;

DETAILED DESCRIPTION OF THE EMBODIMENTS

Figure 1:
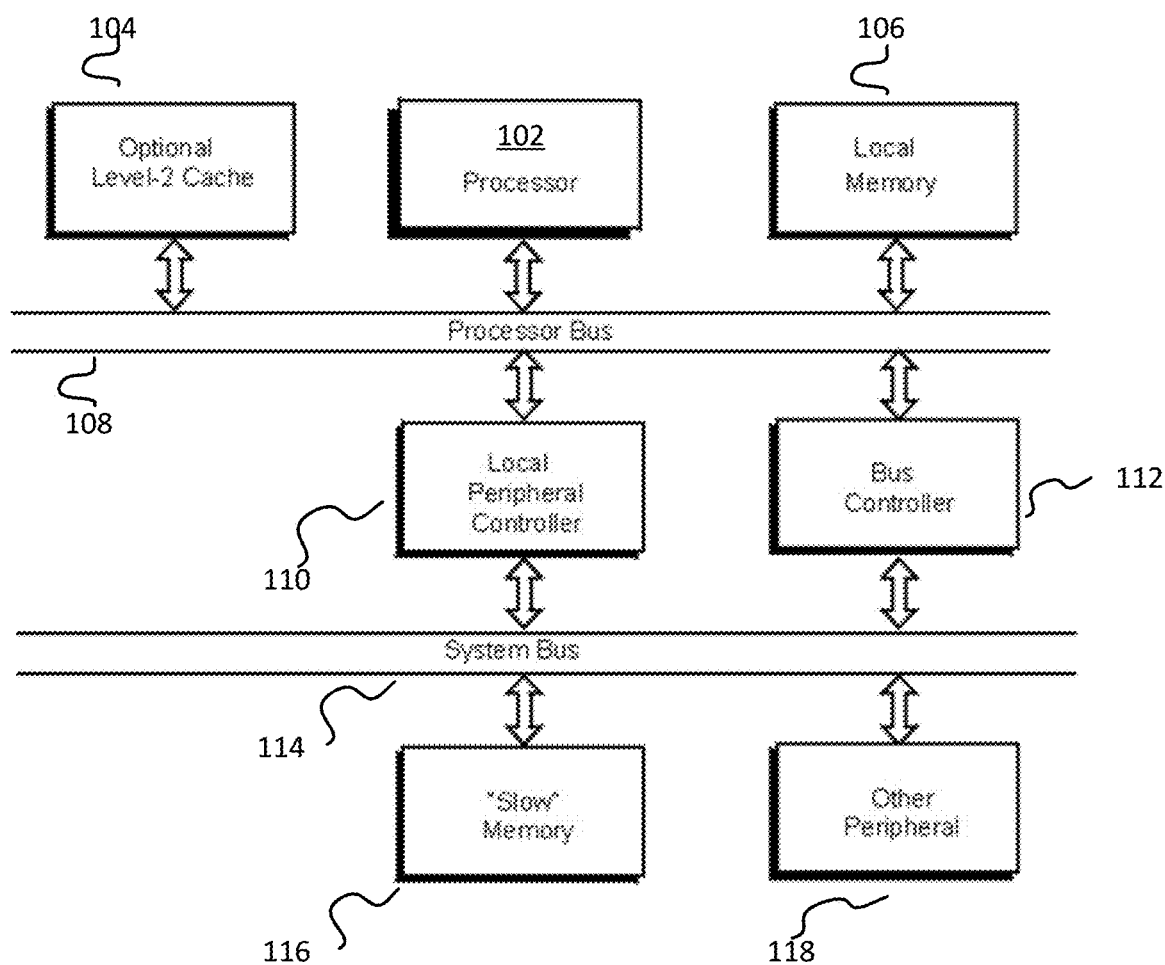
FIG. 1 is a block diagram illustrating a computing system to implement a lightweight trusted task primitive according to an embodiment.

In the following description, numerous specific details are set forth. However, it is understood that embodiments of the disclosure are practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described includes a feature, structure, or characteristic, but every embodiment does not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments whether explicitly described.

Security is a useful feature for Internet of Things (IoT) and wearable computing devices. Many IoT and wearable devices would benefit from the ability to operate within tight cost and energy budgets and at the same time to be resilient against a dynamic and challenging security threat landscape. Security features that can scale to the IoT endpoint or wearable device level are described herein.

Increasingly, the ability to execute code with strong security guarantees (within a Trusted Execution Environment) is recognized as a beneficial security capability for IoT and wearable devices. As devices become connected and host multiple stakeholders, the traditional model of coarse-grained separation based on supervisor and user privileges (Ring 0/Ring 3), or in some cases simply trusting all code in the system, is no longer sufficient.

Some approaches of enabling a Trusted Execution Environment (TEE) have involved dedicated processor modes, special instructions, and dedicated security co-processors. These approaches, however, do not scale easily to the IoT endpoint and wearable design points that would benefit from a more lightweight solution due to extreme cost constraints and resource constraints (memory, CPU cycles).

Embodiments disclosed herein enable a lightweight, scalable, Trusted Execution capability for lightweight, IoT, and wearable platforms, as well as for use in embedded computing systems. Use of the word, "lightweight," herein means disclosed embodiments' performance and resource requirements are aligned with resource-constrained platforms in the IoT and wearable space. Use of the word, "scalable," herein means disclosed embodiments support multiple, mutually isolated TEEs with a flexible range of deployment options. This ability natively to scale to multiple, mutually isolated TEEs is an advantage offered by some embodiments.

Some embodiments disclosed herein enable a Trusted Execution Environment for use in processors and computing devices. A Lightweight Trusted Task (LTT) primitive is defined, which offers one or more of the following advantages:

Memory isolation. An LTT is isolated from other tasks running on the system. This includes OS/applications/drivers/other LTT-mode tasks.

Entry point enforcement. The entry point to a LTT is well-defined and not modifiable by any entity external to the LTT.

Secure Interrupts. An LTT can be asynchronously interrupted and does not leak information on context switch. Embodiments disclosed herein operate to protect the confidentiality and integrity of the LTT.

LTT binding. An LTT can be securely bound to an entity external to the processor, for example, a System-On-a-Chip (SoC) agent.

Debug Capability. An LTT can be debugged using available debug and trace features offered by some processors and processor cores. For production, debug and trace can be disabled on a per-LTT basis.

Complex Security Architectures can be supported: Using the LTT primitive, complex security architectures can be built. For example, Trusted Computing concepts such as attestation and sealing can be enabled. Multi-stakeholder scenarios, e.g., multiple, mutually distrusting third-parties, can be supported.

Multiple Usages can be supported: Multiple, mutually isolated LTT-mode tasks are supported in contrast to solutions that offer a secure world/non-secure world model. This opens multi-stakeholder usage models where one or more third parties can provision LTT-mode tasks into the system.

Hardware requirements. As described further below, the additional hardware requirements to support the LTT primitive on a processor or processor core in some embodiments are limited to one control and status model-specific register (MSR), and four protected memory region base/mask range model-specific register pairs. In some embodiments, 206 microps are required (~1.2 KB) to be stored in the firmware read-only memory (ROM).

Leverage processor capabilities: In some embodiments, for example as implemented in processors and processor cores, lightweight trusted tasks (LTT-mode tasks) leverage Protected Mode capabilities which already provide mechanisms to enhance software resilience and robustness. Segmentation enables memory isolation between tasks at byte-granularity, while task management circuitry supports hardware task switching, i.e., the overhead associated with task context switching is assumed by the processor rather than software. Where necessary, embodiments disclosed herein augment these features to provide the properties desired for Lightweight Trusted Tasks. The result is a task-centric approach to trusted execution, where the task primitive is used to provide multiple, mutually isolated execution environments.

It is to be appreciated that embodiments using LTT-mode tasks as described herein below are applied to various types of processor architectures that provide protected mode memory and task management circuitry.

FIG. 1 is a block diagram illustrating a computing system to implement a lightweight trusted task primitive according to an embodiment. As shown, the processor 102 interacts with optional level-2 cache 104, local memory 106, local peripheral controller 110, and bus controller 112 via processor bus 108. Local peripheral controller 110 and bus controller 112 interact with "slow" memory 116 and other peripheral 118 via system bus 114.

Processor 102 is not limited to any particular manufacturer or instruction set architecture.

Figure 2:
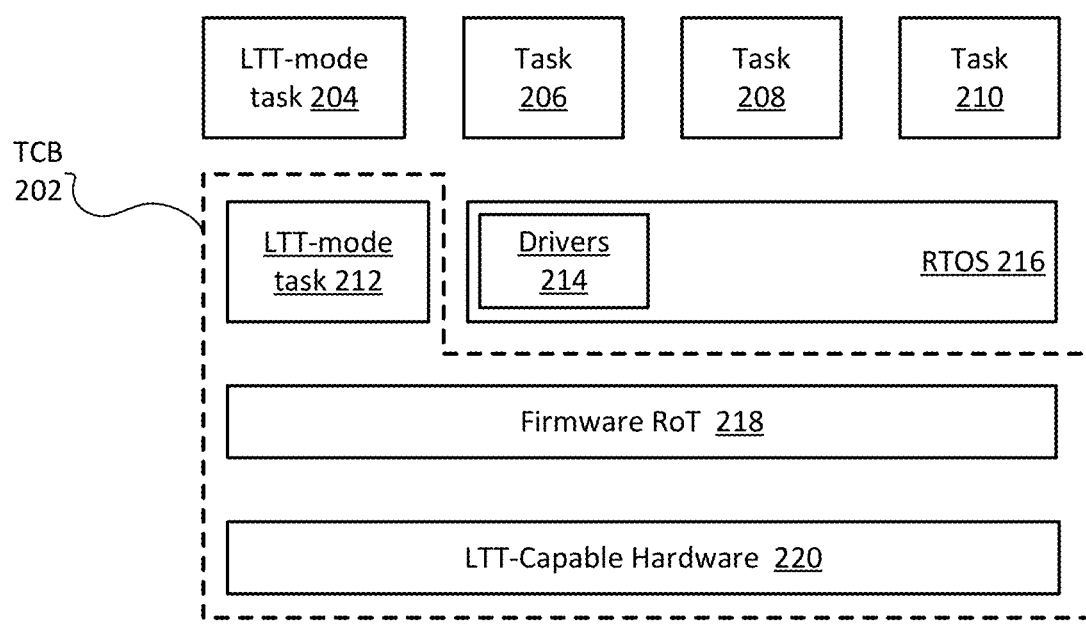
FIG. 2 is a block diagram illustrating a system architecture to implement a lightweight trusted task primitive according to an embodiment.

FIG. 2 is a block diagram illustrating a system architecture to implement a lightweight trusted task primitive according to an embodiment. As shown, LTT-mode task 212 together with firmware RoT 218 and LTT-capable hardware 220 comprise the Trusted Computing Base (TCB) 202. TCB 202, indicated by a dashed line, is a set of hardware and software components that are trusted in the system. LTT-mode task 212 utilizes a memory protection mechanism of a processor to protect against accesses to its code, data, stack and configuration from outside TCB 202. Use of a LTT primitive prevents access to the code, data, stack, and configuration of LTT-mode task 212 by task 206, task 208, task 210, drivers 214, or real-time operating system (RTOS) 216.

A LTT primitive can thus be used to prevent access to the code, data, stack, and configuration of LTT-mode task 212 even by another LTT-mode task 204. For example, LTT-mode task 212 may be a trusted deployment by an original equipment manufacturer (OEM), while LTT-mode task 204 may be an untrusted deployment by a customer. Using a LTT mode primitive isolates LTT-mode task 212 from the operating system, from other tasks, and even from other LTT-mode tasks, such as LTT-mode task 204. In other words, use of a LTT primitive can mutually exclude even other LTT-mode tasks from accessing each other's code, data, stack, and configuration.

An attempt to access the data, code, stack, or configuration of LTT-mode task 212 from outside the TCB is configured to generate a fault.

FIG. 2 shows a basic architecture building on LTT primitives. As shown, the security architecture contains:
1. LTT-capable hardware 220;
2. Firmware Root-of-Trust (RoT) 218 to configure and lock down LTT-mode task 212;
3. Real-Time Operating System (RTOS) 216, which includes drivers 214;
4. One or more additional LTT-mode tasks 204; and
5. Additional tasks 206, 208, and 210.

As further shown in FIG. 2, Trusted Computing Base (TCB) 202, indicated by the dashed line, includes LTT-mode task 212 and excludes RTOS 216, drivers 214, additional LTT-mode task 204, and tasks 206, 208, and 210. By utilizing a memory protection mechanism of a processor, confidentiality and integrity of LTT-mode task 212 is maintained even if the security of any one or more of RTOS 216, drivers 214, additional LTT-mode task 204, and tasks 206, 208, and 210 is compromised. LTT-mode task 212 is thus protected against security compromises in any one or more of RTOS 216, drivers 214, additional LTT-mode task 204, and tasks 206, 208, and 210, regardless of the operating privilege level—Ring 0, Ring 1, Ring 2 or Ring 3—and even in another LTT-mode task 204.

By building on the LTT primitive, complex security architectures can be enabled which provide security protection beyond that of a security architecture that is limited to privilege separation. Use of LTT primitives may enable advanced protection techniques, for example to ensure device integrity, attestation, isolation and protected storage, as described, for example, in the "TPM 2.0 Mobile Reference Architecture Reference," promulgated by the Trusted Computer Group, Inc.

Figure 3:
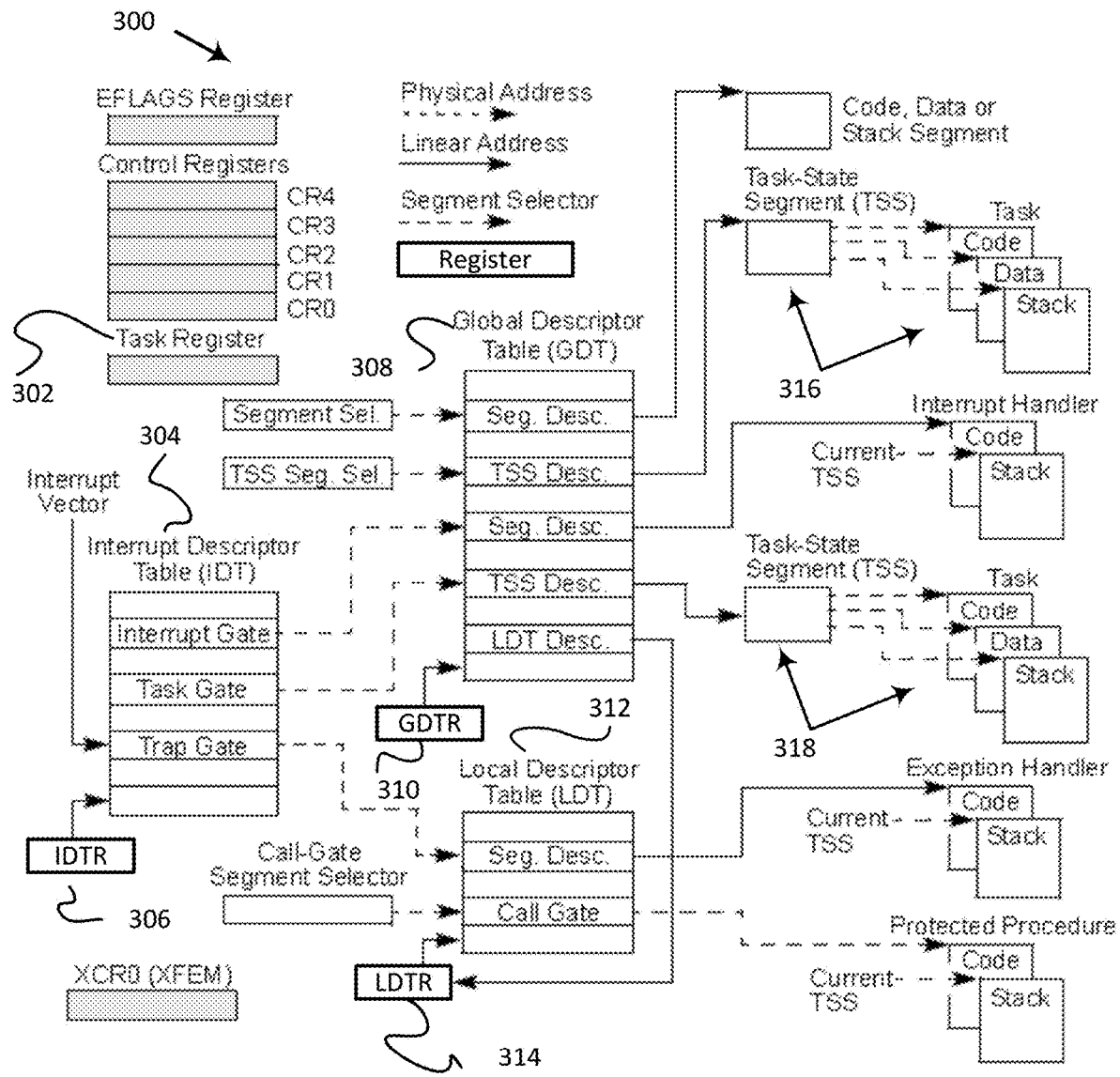
FIG. 3 shows one embodiment of a memory map to implement a lightweight trusted task primitive.

FIG. 3 shows one embodiment of system level data structures and system-level registers of a processor used to implement the lightweight trusted task primitive. The system-level data structures and registers 300 include EFLAGS, control, and task registers 302, interrupt descriptor table (IDT) 304, interrupt descriptor table register (IDTR) 306, global descriptor table (GDT) 308, global descriptor table register (GDTR) 310, local descriptor table (LDT) 312, local descriptor table register (LDTR) 314, registers, memory structures, and a Task State Segment (TSS) data structure for use by a first task 316, and registers, memory structures, and a TSS data structure for use by a second task 318.

Protected Mode Segmentation and Task Management Circuitry

Protected-mode segmentation and task management circuitry are configured using a set of System Data Structures, shown in FIG. 3, which are configured by privileged (Ring 0) code. In the embodiment of FIG. 3, these data structures are the:

1. Global Descriptor Table (GDT) 308. The GDT 308 defines protected-mode segmentation globally across all tasks. GDTR 310 defines the base-address of GDT 308.
2. Local Descriptor Table (LDT) 312. The LDT 312 defines protected-mode segmentation on a per-task basis. LDTR 314 defines the base-address for the LDT 312 of the currently active task.
3. Task State Segment (TSS) 316 and 318. The TSS 316 and 318 contain the context for one or more tasks and are saved/restored on context switch by the task management circuitry. The Task Register (TR) 302 points to the currently active task. Task management circuitry to associate a Task State Segment (TSS) with a task to store contextual state information of the task before suspension and to recall contextual state information when restoring the task.
4. Interrupt Descriptor Table (IDT) 304. The IDT 304 defines the vectors for interrupts and exceptions. IDTR 306 points to the base-address of IDT 304.

In some embodiments, a memory protection circuit accesses a descriptor table stored in physical memory and containing a plurality of segment descriptors to provide a base address and access rights for the code, data, and stack segments of at least one LTT-mode task and the at least one non-LTT-mode task. For example, in a processor, the local descriptor table (LDT) and global descriptor table (GDT) are descriptor tables that contain segment descriptors to provide a base address and access rights for the code, data, and stack segments of at least one LTT-mode task and the at least one non-LTT-mode task. In some embodiments, the memory protection circuit also includes execution circuitry to receive at least one memory access request from the processor executing code from the non-LTT-mode task, and retrieves a segment descriptor from the descriptor table by comparing the segment descriptor base address to an address of the at least one memory access request. The memory protection circuit further protects against any non-LTT-mode task accessing the code, data, and stack segments of the LTT-mode task, regardless of a privilege level of the at least one non-LTT-mode task.

Even if the non-LTT-mode tasks is running at Ring 0, it cannot access the code, data, and stack segments or the configuration of the LTT-mode task. This behavior provides an advantage over protection mechanisms that just use privilege levels to isolate tasks, for example, because this behavior prevents a non-LTT-mode ring 0 task that has been compromised from accessing or manipulating the LTT-mode task.

In some embodiments, the memory protection circuit uses the processor to fetch, decode, and execute instructions from physical memory, the execution to occur in a protected mode and at a ring 0 privilege level. In some embodiments, the memory protection circuit uses the processor to fetch, decode, and execute instructions from a firmware read-only memory (ROM), the execution to occur in a protected mode and at a ring 0 privilege level. In some embodiments, the memory protection circuit uses the processor to fetch, decode, and execute instructions from a firmware FLASH ROM, the execution to occur in a protected mode and at a ring 0 privilege level.

Figure 4:
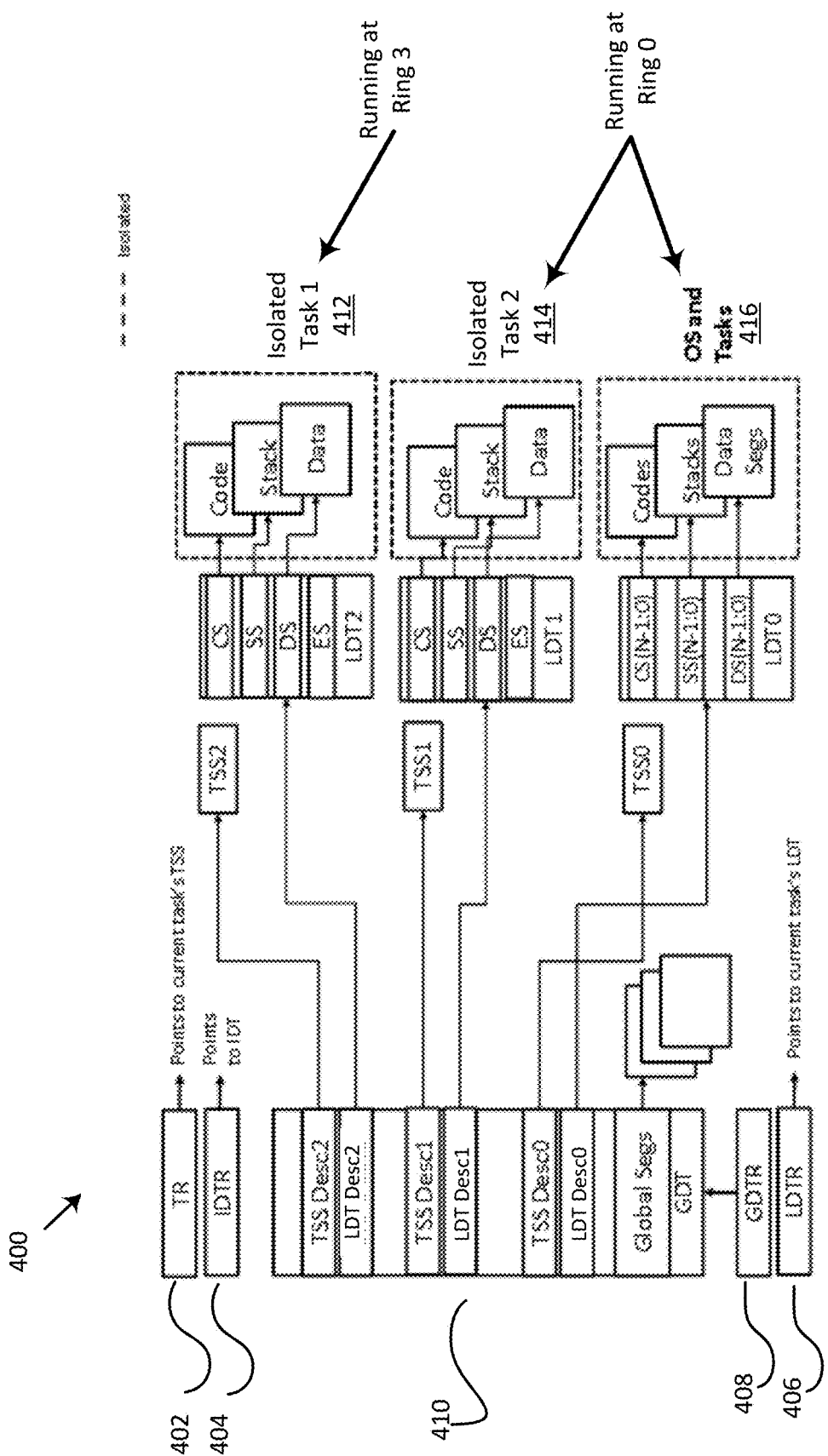
FIG. 4 is a diagram showing the use of Protected Mode features in a processor to isolate tasks from each other according to an embodiment.

FIG. 4 is a diagram showing the use of Protected Mode features in a processor to isolate tasks from each other. As shown, system data structures 400 include task register (TR) 402, which points to the current task's Task State Segment (TSS), interrupt descriptor table register (IDTR) 404, which points to an interrupt descriptor table, local descriptor table register (LDTR) 406, which points to the current task's local descriptor table, and global descriptor table register (GDTR) 408, which points to global descriptor table (GDT) 410. FIG. 4 further shows isolated task 1 412, isolated task 2 414, and operating system and tasks (OS/Tasks) 416, each of which includes a Task State Segment (TSS), a local descriptor table, and a protected memory region including code, stacks, and data segments.

FIG. 4 shows how, using the Protected Mode features of a processor, three isolated address spaces would be configured, allowing an OS and its tasks, isolated task 1 and isolated task 2 to be mutually isolated from each other as illustrated by the dashed lines around their code, stacks, and data segment memory regions. This Protected Mode protection model is configured by setting up the GDT 410, the LDT of the current task, the IDT (not shown), and TSS system data structures appropriately and pointing the TR 402, IDTR 404, LDTR 406, and GDTR 408 base address registers to their associated data structures.

Protected Mode enables SW architectures which increase software robustness and reliability. In the illustrated embodiment, isolated task 1 412 is running at a Ring 3 privilege level, while isolated task 2 414 and OS/tasks 416 are running a Ring 0. From a security perspective, there is an implicit assumption that privileged (Ring 0) code is trusted. However, in FIG. 4, although there are 3 isolated address spaces within the dashed-line boxes, a security compromise within OS/tasks 416 or isolated task 2 414, which run in Ring 0, will result in a compromise of the entire system.

Embodiments disclosed herein, on the other hand, assume that privileged (Ring 0) code is untrusted and introduce access controls and extensions to Protected Mode that prevent privileged code from manipulating Protected Mode features. The result is an augmented Protected Mode, which allows tasks to be executed with stronger security.

Figure 5:
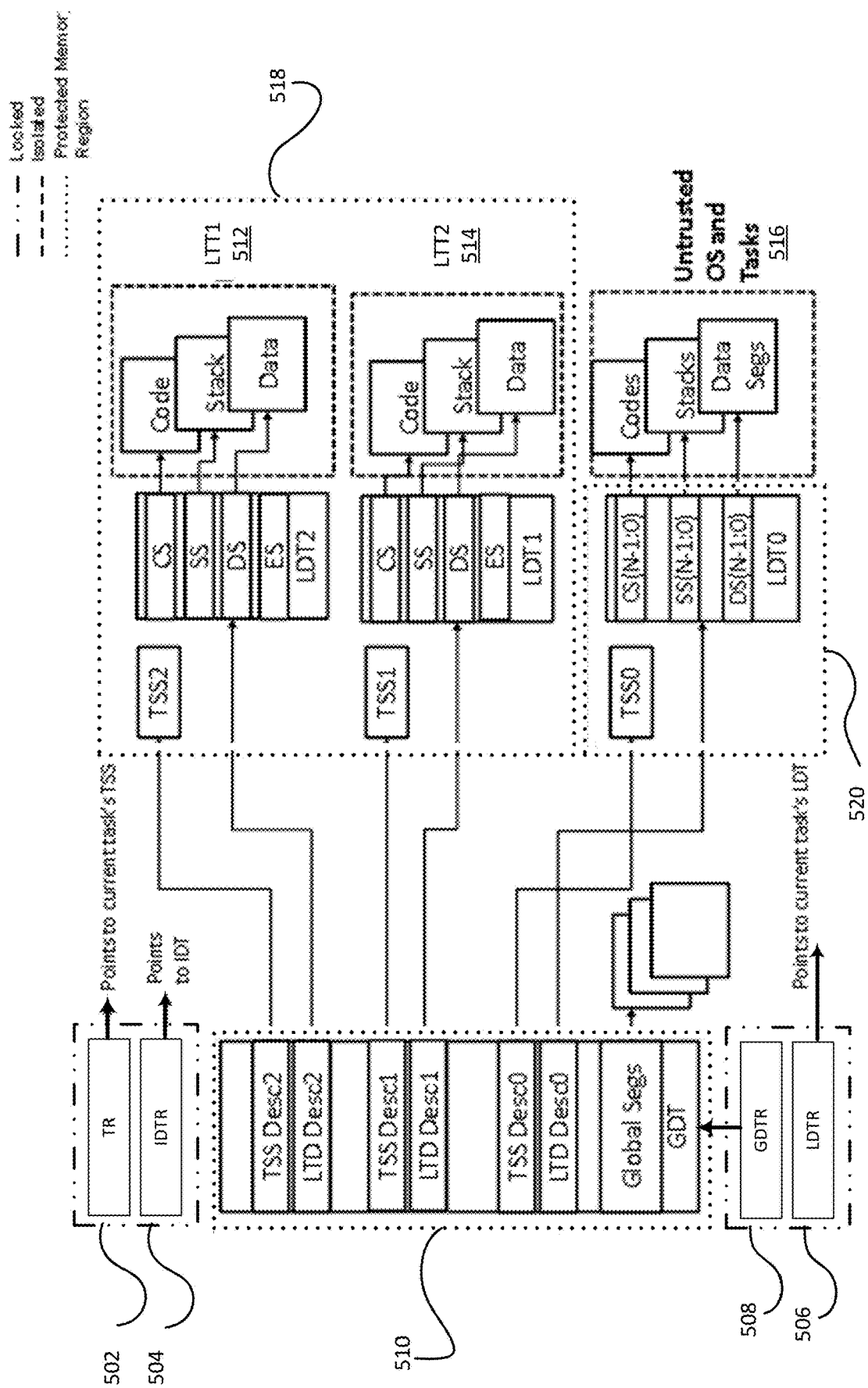
FIG. 5 is diagram showing a memory structure to implement a protection mode using lightweight trusted tasks according to an embodiment.

FIG. 5 is a diagram showing the lock down and protected memory regions of a lightweight trusted task that provide protection, even from other privileged Ring 0 tasks, according to an embodiment. The embodiment of FIG. 5 uses privileged code lock-down of the system data structure base-address registers (IDTR 504, LDTR 506, and GDTR 508) and task register (TR 502). Once locked, attempts by code of any privilege level to manipulate those resources are prevented. Additionally, a protected memory region 518 is defined, within which are placed the system data structures 510, TSS and LDT data structures, as well as the code, stack, and data memory regions associated with the trusted LTT1 512 and trusted LTT2 514. Attempts to access the protected memory region by non-LTT code of any privilege level will fail. As shown, TSS0 and LDT0 are within a protected memory region 520.

As shown, the TSS and LDT data structures associated with untrusted OS and tasks 516 are included within the protected memory region, but the code, stack, and data regions of untrusted OS and tasks 516 is outside the protected memory region and is prevented from accessing registers and memory regions within the protected memory region.

Using the approach of FIG. 5 provides an advantage over the architecture of FIG. 4 because the isolation properties of the OS/Tasks and the LTT-mode tasks are maintained even if privileged, Ring 0 code is compromised and attempts to subvert the configuration.

Lightweight Trusted Task Primitive

FIG. 6 shows a lightweight trusted tasks control and status register according to an embodiment. The LTT control and status register 600 in some embodiments is a software-accessible model-specific register (MSR) provided by a processor to enable the LTT feature, indicate whether the feature is active, and lock down the feature until the next system reset. As shown, LTT control and status register 600 is a 64-bit register that includes a readable and writeable LTT feature enable bit 606 at bit 0, a readable LTT feature active bit 604 at bit 1, and a readable and writeable lock bit 602 at bit 2. Bits 63 to 3 are reserved.

As described at 608, readable and writeable LTT feature enable bit 606, when set, enables the LTT-mode.

As described at 610, readable LTT feature active bit 604, when set, indicates that the LTT-mode is active.

As described at 612, readable and writeable Lock bit 602, when set, locks the LTT control and status register, for example, register 600, such that any further writes to the LTT control or status register generate a fault. In some embodiments, lock bit 602, once set, cannot be cleared except through a system reset. In normal usage, lock bit 602 is set once LTT configuration is complete and the LTT feature is enabled.

As described at 614, bits 63 to 3 of the LTT control and status register 600 are read-only and return zero (0) on a read. A write to the reserved bits generates a fault.

Enabling the LTT Feature

Figure 7:
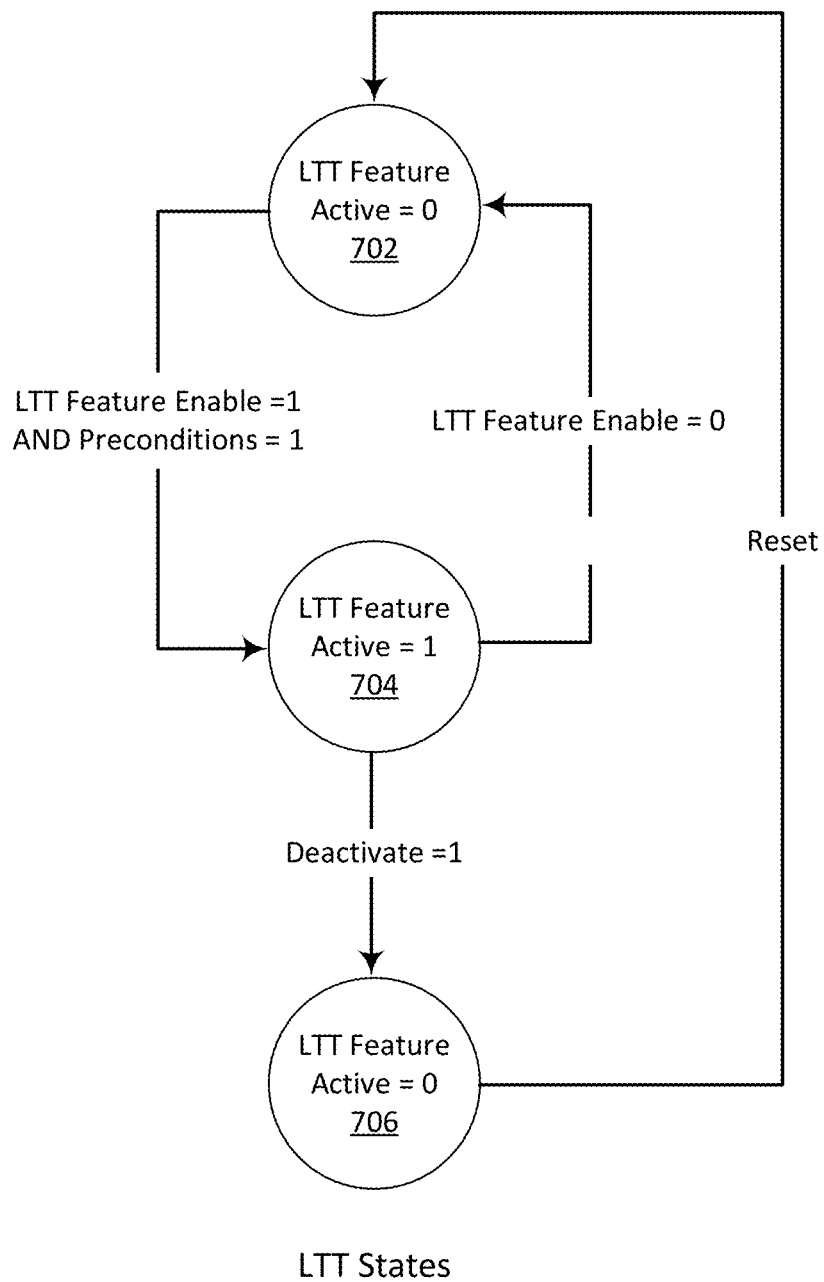
FIG. 7 is a flow diagram of an execution flow of lightweight trusted task (LTT) states according to some embodiments.

FIG. 7 is a flow diagram of an execution flow of lightweight trusted task (LTT) states according to some embodiments. As shown, the LTT execution flow includes three states, 702 and 706, during which the LTT feature is inactive, and 704, during which the LTT feature is active. As used herein, the LTT feature is sometimes referred to as the LTT-mode.

As shown, the LTT feature active bit is active high, meaning it is active when it is equal to 1, and inactive when it is equal to 0. In other embodiments, the active bit is encoded differently. The current LTT feature state can be determined by software by reading the LTT feature active bit 604 of the LTT control and status register 600 (FIG. 6).

In some embodiments, the LTT feature can be disabled altogether by writing a 0 to the LTT feature enable bit 606 of the LTT status and control register 600 (FIG. 6). If the LTT feature is disabled, it does not matter what state the LTT state diagram is in; the LTT feature will be disabled.

As shown, upon a reset, the LTT state diagram transitions to state 702, during which the LTT feature is inactive. While in state 702, enabling the LTT feature by setting the LTT feature enable bit 606 of the LTT status and control register 600, assuming a set of pre-conditions is true, transitions the state to 704, during which the LTT feature is active.

The set of pre-conditions is implementation specific. In one embodiment, the set of preconditions is not true if a machine check exception has been generated, for example by a machine check architecture of a processor, before setting the LTT feature enable bit. If the set of preconditions is not true, the LTT state diagram remains in state 702, with the LTT feature inactive.

As described above, activating the LTT feature while in state 702 can be done by writing a 1 to the LTT feature enable bit 606 of the LTT control and status register 600. In some embodiments, a writemask is used during the write to only allow bit 606 to be modified. In some embodiments, a read-modify-write is used to read the LTT control and status register 600, modify just the LTT feature enable bit 606, and write it back.

After the LTT feature is activated, the LTT state diagram remains in state 704 with the LTT feature active until the LTT feature is deactivated or disabled. In some embodiments, during normal operation, the LTT state diagram will be in state 704 and the LTT feature enable bit 606 and the LTT feature active bit 504 will both be equal to 1.

While in state 704, the LTT feature can be disabled by writing a 0 to the LTT feature enable bit 606 of the LTT status and control register 600. Upon being disabled, the LTT state diagram transitions to state 702, during which the LTT feature is disabled (bit 606=0) and inactive (bit 604=0).

While in state 704, the LTT feature can also be deactivated in response to a deactivation event. Upon being deactivated, the LTT state diagram transitions to state 706, during which the LTT feature is inactive. Deactivation events are implementation-specific. In some embodiments, a machine check exception, generated for example by a processor machine check architecture, results in a deactivation event. In some embodiments, disabling a previously enabled machine check architecture results in a deactivation event. As used herein, a machine check architecture is a mechanism by which a processor reports hardware errors to an operating system.

Once deactivated, the LTT state diagram remains in 706 until a reset occurs, upon which the state diagram transitions to state 702, with the LTT feature is disabled (bit 606=0) and inactive (bit 604=0).

In some embodiments, when the LTT execution flow is in the 704 state and the LTT feature is active, receipt of a deactivation event causes the LTT state diagram to transition directly to 702, rather than to transition to state 706. For the sake of simplicity, this transition is not shown in FIG. 7.

Behaviors Associated with LTT Primitives

Once enabled, some embodiments of lightweight trusted task primitives cause a set of behavioral changes to standard processor behaviors. Some embodiments of LTT primitives are meant to prevent privileged code from manipulating a LTT configuration. When used in conjunction with the Lock feature, a LTT configuration can be locked down until next system reset. In this way, a firmware Root-of-Trust, which in some embodiments is immutable and executed as the first code after reset, can configure a LTT configuration and then lock it down before handing over to the next stage, e.g. an OS. The firmware Root-of-Trust in some embodiments runs in a protected mode of operation.

Once LTT features are enabled, at least one or more of the following behavioral changes come into effect:

1. CPU mode switch. LTT-mode tasks require Protected Mode to be active and attempts to switch to any other CPU mode will raise a CPU exception.

2. LGDT/LIDT Instruction. Execution will raise a CPU exception.

3. LLDT Instruction. Execution will raise a CPU exception.

4. LTR Instruction. Execution will raise a CPU exception.

5. INVD instruction. Executing INVD will result in conversion to WBIND.

6. SYSENTER/SYSEXIT. Execution will raise a CPU exception.

7. Device relocation. Devices residing within the CPU boundary that support relocation (e.g. APIC) will raise a CPU exception on relocation attempts.

8. CPU caches supporting non-eviction mode will raise a CPU exception on attempts to enable/disable non-eviction mode.

9. Task IO Permissions. IO permissions are always checked for LTT-mode tasks and untrusted tasks regardless of privilege level.

Protected Memory Regions

In some embodiments, the Protected Mode system data structures and each Lightweight Trusted Task reside in a protected memory region. Protected memory regions attempt to prevent untrusted code, e.g. non-LTT code, from accessing LTT code/data or the system data structures which define Protected Mode behavior. Both accesses resulting from direct memory references or memory references resulting from one or more levels of indirection, e.g. from page management or memory management circuitry mappings, are prohibited.

In this way, the integrity and confidentiality of LTT data, code and the system data structures is maintained for paged and non-paged usages. The number of protected memory regions is implementation specific.

In some embodiments, the OS address space is set flat (to 4GB). In a LTT environment, protected memory regions have the benefit of allowing the OS to continue using this approach, simplifying OS porting effort while maintaining confidentiality and integrity for LTT primitives and system data structures.

Table 3, below, describes the protections afforded to data and data structures within a protected memory region. Table 3 references three memory access type categories, and defines a behavior for each one:

1. Explicit Accesses are memory accesses resulting from code execution at any privilege level; Table 3 distinguishes behaviors for explicit accesses by standard tasks from explicit accesses by lightweight trusted tasks;
2. Implicit accesses are memory accesses which are issued by the underlying CPU architecture to perform its operations. Example operations are accesses to the GDT/LDT/IDT/TSS; and
3. Debug Access are memory accesses resulting from a debug feature.

TABLE 3

Behavior when accessing inside and outside protected memory regions

| Access Type | Task Type | Behavior (access inside protected memory region) | Behavior (access outside protected memory region) |
| --- | --- | --- | --- |
| Explicit access | Standard Task | Redirect to abort page, force memory type uncached | Access Permitted |
| Explicit access | Lightweight Trusted Task | Access forced to be non-paged | |
| Implicit Access | X (Don't Care) | | |
| Debug access | X (Don't Care) | Redirect to abort page, force memory type uncached | Access Permitted |

Figure 8:
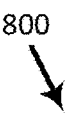
FIG. 8 shows a protected memory region base model-specific register according to an embodiment.

FIG. 8 shows a protected memory region base address register according to an embodiment. As shown, protected memory region base address register 800 includes a base field 804 at bits {MAXPHYSADDR-1: 12}, reserved fields 802 at bits [63: MAXPHYSADDR], and reserved field 806 at bits [11:0]. MAXPHYSADDR is an implementation-specific constant. FIG. 8 describes the base 808 as a read/writeable register that defines the lower address limit of the range register. FIG. 8 also describes reserved field 810 as a read-only register that returns 0 on reads, and which generates a fault on a write.

FIG. 9 shows a protected memory region mask register according to an embodiment. As shown, protected memory region mask register 900 includes a mask field 904 at bits [MAXPHYSADDRESS-1: 12], a valid field 906 at bit [11], reserved field 902 at bits [63: MAXPHYSICALADDRESS], and reserved field 908 at bits [10:0]. FIG. 9 shows the valid field at 910 as a read/writeable register that, when set, signifies that the contents of the base and mask registers are valid. FIG. 9 also describes the mask field at 912 as a read/writeable register that defines the mask portion of the Range Register. FIG. 9 also describes reserved field 914 as a read-only register that returns 0 on reads, and which generates a fault on a write. Some embodiments include multiple protected memory regions, each one being defined by a base address register, such as base address register 800, and by a mask register, such as mask register 900.

One implementation of a protected memory region uses a base address range register as shown in FIG. 8 and a mask range register as shown in FIG. 9 to define each protected memory region. Multiple non-contiguous protected memory regions can exist, each defined by the pair of range registers. Overlapping protected memory regions are supported, in which case the resultant protected memory region comprises the union of the individual protected memory regions.

LTT-mode Extensions to Protected Mode

Lightweight Trusted Tasks is a task-centric technology which builds on the Protected Mode tasking feature. Embodiments disclosed herein introduce a new task type, the Lightweight Trusted Task (LTT).

Figure 10:
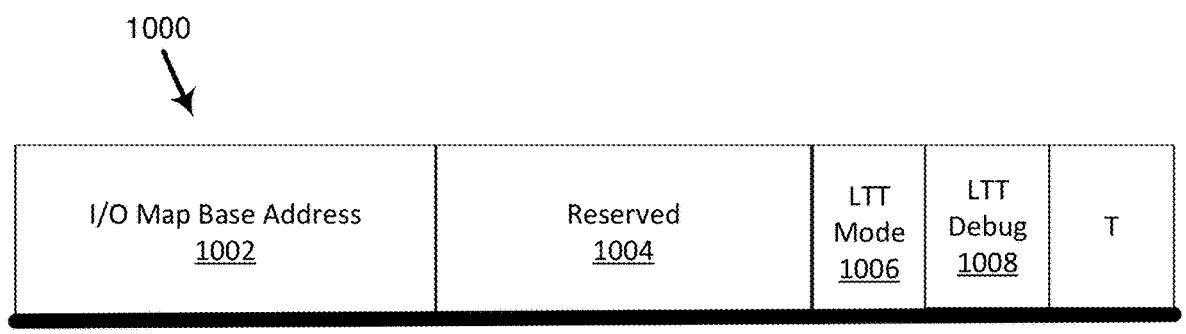
FIG. 10 shows a task segment register extended for use by Lightweight Trusted Tasks according to an embodiment.

FIG. 10 is a task segment register extended for use by Lightweight Trusted Tasks according to an embodiment. Protected Mode employs a data structure called the Task State Segment (TSS) to store a task context. The TSS includes an I/O map base address 1002 and a reserved field 1004. As shown in FIG. 10, Lightweight Trusted Tasks extends this data structure 1000 by two bits to support LTT-mode tasks (see FIG. 6):

1. LTT-MODE bit 1006 (TSS offset decimal 100, bit 2);
2. LTT DBG bit 1008 (TSS offset decimal 100, bit 1).

The LTT-MODE bit 1006, when set, indicates to the underlying CPU architecture that the current task is a Lightweight Trusted Task. When clear, the task behaves as a standard Protected Mode task. The LTT debug bit 1008 provides a debug opt-in capability for LTT-mode tasks.

When clear, standard debug features are suppressed on LTT entry and unsuppressed on LTT exit, it is possible to opt-in to debug on a per-LTT basis by setting the LTT DBG bit. In this case, the set of all debug features which are available to standard (non-LTT) tasks are made available to the LTT.

In some embodiments disclosed herein, LTT-mode tasks differ from standard Protected Mode tasks in three ways. First, LTT-mode tasks may read or write to the protected memory region with no restrictions. Second, LTT-mode tasks are non-paged. That means that memory accesses generated by LTT-mode tasks behave as if paging is disabled, regardless of whether the paging circuitry (or memory management circuitry) is enabled. Third, LTT tasks must opt into debug on a per-LTT basis.

In implementations that include a paging unit (memory management circuitry), switching between standard tasks and LTT-mode tasks may flush both local and global Translation Lookaside Buffers (TLB).

Furthermore, some embodiments disclosed herein introduce new TSS exceptions beyond those already defined by the processor. First, an exception occurs when LTT-mode tasks are enabled and a 16-bit Task State Segment is encountered. Second, an exception occurs when LTT-mode tasks are enabled and a VM-8086 task is encountered. Third, an exception occurs when LTT-mode tasks are enabled but inactive and a LTT-mode task is encountered. In some embodiments, these new TSS exceptions leverage and make use of an invalid TSS exception already defined in a processor to be asserted upon occurrence of an error related to the TSS.

Standard Protected Mode tasks, include an IO permission bitmap which provides a mechanism to restrict access to I/O ports on a per-task basis [1]. When Lightweight Trusted Tasks are enabled, the IO permission bitmap which restricts which IO ports are accessible to a task or LTT is always applied and honored, regardless of privilege level.

Figure 11:
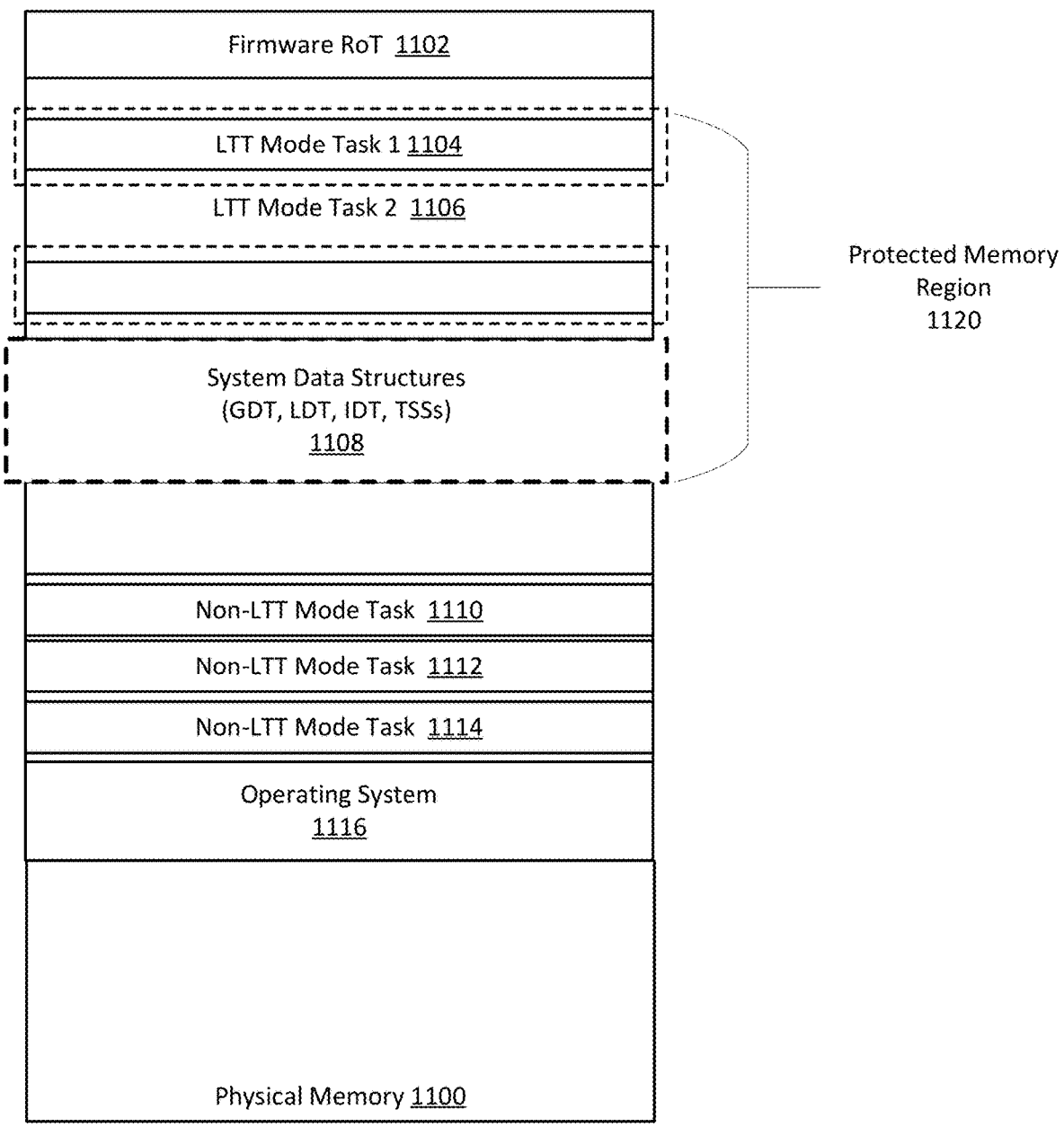
FIG. 11 shows an embodiment of a physical memory map implementing lightweight trusted tasks.

FIG. 11 shows an embodiment of a physical memory map implementing lightweight trusted tasks. FIG. 11 shows physical memory 1100 configured for use with LTT-mode tasks. A firmware RoT 1102 (Root-of-Trust) is responsible for LTT configuration and lockdown. In some embodiments, protection is enhanced by preventing the RoT 1102 from changing or being altered. In some embodiments, protection is enhanced by attempting to schedule RoT 1102 for execution as among the first code to execute after reset. Physical memory 1100 includes an operating system 1116 and non-LTT-mode tasks 1110, 1112, and 1114 configured as standard protected mode tasks.

Memory map 1100 also includes LTT-mode task 1 1104, LTT-mode task 2 1106, and system data structures (GDT, LDT, IDT, TSSs) 1108, each of which is in a protected memory region 1120 (dashed lines), signifying that they reside within a protected memory region. Mutual isolation of LTT1, LTT2 and the system data structures is flexibly achieved using Protected Mode. The protected memory region isolates LTT1, LTT2 and system data structures from accesses by any standard (non-LTT) task.

Memory Type and Caching Controls

Lightweight Trusted Task implementations on architectures with memory type controls, e.g. Memory Type Range Registers, Page Attribute Tables or caching controls, e.g. cache enable/disable, cache not write-through, may require cache self-snoop.

SoC Fabric Indication

Lightweight Trusted Tasks support usages where peripherals external to the processor core can be bound to a specific LTT. This capability requires support from the SoC fabric in terms of SoC fabric policy enforcement. The details of SoC fabric policy enforcement is implementation dependent and outside the scope of this document.

Figure 12:
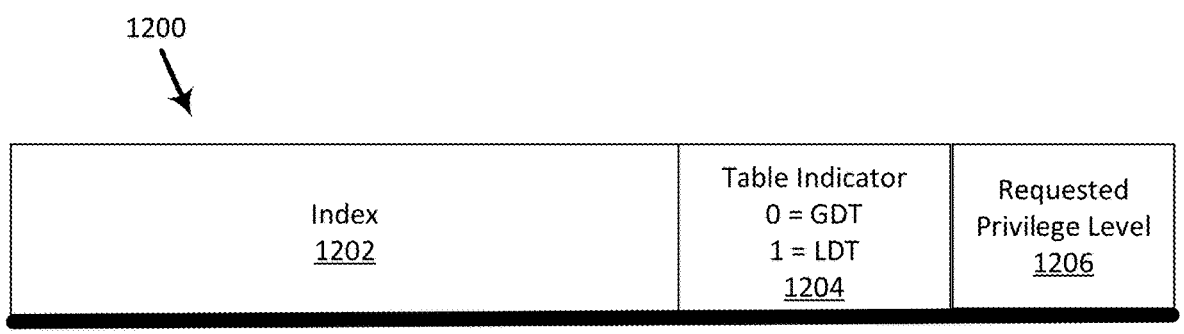
FIG. 12 shows a task register containing the Task State Segment (TSS) selector of a currently active task according to an embodiment.

FIG. 12 shows a task register containing the TSS selector of a currently active task according to an embodiment. During operation, the task register (TR) 1200 contains the TSS selector of the currently active task (IA-task or LTT-mode task). LTT mode makes index 1202 at bits 15:3 of the task register 1200 available at the processor core interface to indicate the currently active task as the signal TSS_SEL. The task register contains the TSS selector for the currently active task. TR 1200 also includes table indicator 1204, to indicate whether the task segment descriptor is in the local descriptor table or in the global descriptor table. TR 1200 also includes a requested privilege level 1206 to indicate whether the task requests a ring 0 privilege. Note that an active task can be an IA-task or a LTT-mode task. The mapping between a specific TSS selector and task type is configured by the firmware RoT and locked down using LTT's locking mechanisms.

Figure 13:
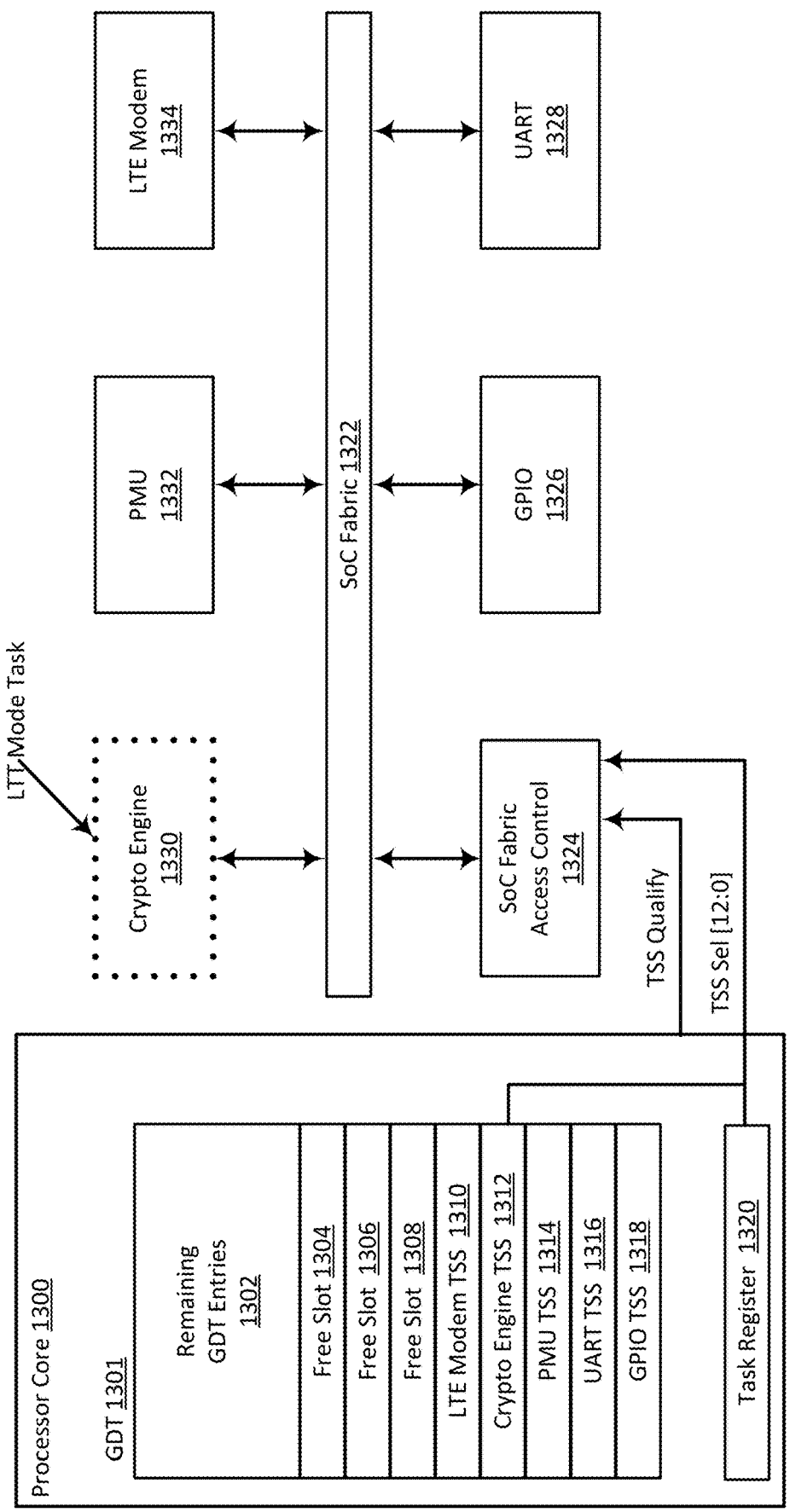
FIG. 13 shows an embodiment of a system on a chip (SoC) using a LTT-mode task.

FIG. 13 shows an embodiment of a system on a chip (SoC) using a LTT-mode task. As shown, the SoC includes a processor core 1300 and an SoC fabric 1322 to which are connected a plurality of functional units: an SoC fabric control 1324, GPIO 1326, UART 1328, crypto engine 1330, PMU 1332, and LTE modem 1334. Processor core 1300 includes a global descriptor table (GDT) 1301 that contains GPIO TSS 1318, UART TSS 1316, PMU TSS 1314, Crypto Engine TSS 1312, LTE Modem TSS 1310, free slots 1304, 1306, and 1308, and remaining GDT entries 1302. Processor core 1300 also includes task register 1320 to select the currently-executing task. In this embodiment, only the crypto engine 1330 is a LTT-mode task; the remaining tasks are standard tasks. When the crypto engine 1330 is active, an active high qualifier, TSS QUALIFY, is provided for the TSS_SEL signal. TSS Sel [12:0] is set to Task Register (15:3) and TSS QUALIFY=TSS.LTT_MODE.

Usage of the TSS selector and qualifier by the wider SoC is implementation dependent. All 13 bits need not necessarily be used by the SoC. A simple usage model would just use TSS_SEL_QUAL to indicate that the currently executing task is secure or non-secure. More complex usages would decode all or a subset of the TSS selector to tie LTT-mode tasks to specific SoC peripherals. FIG. 9 shows an example usage of TSS_SEL and TSS_SEL_QUAL in a typical SoC context.

Figure 14:
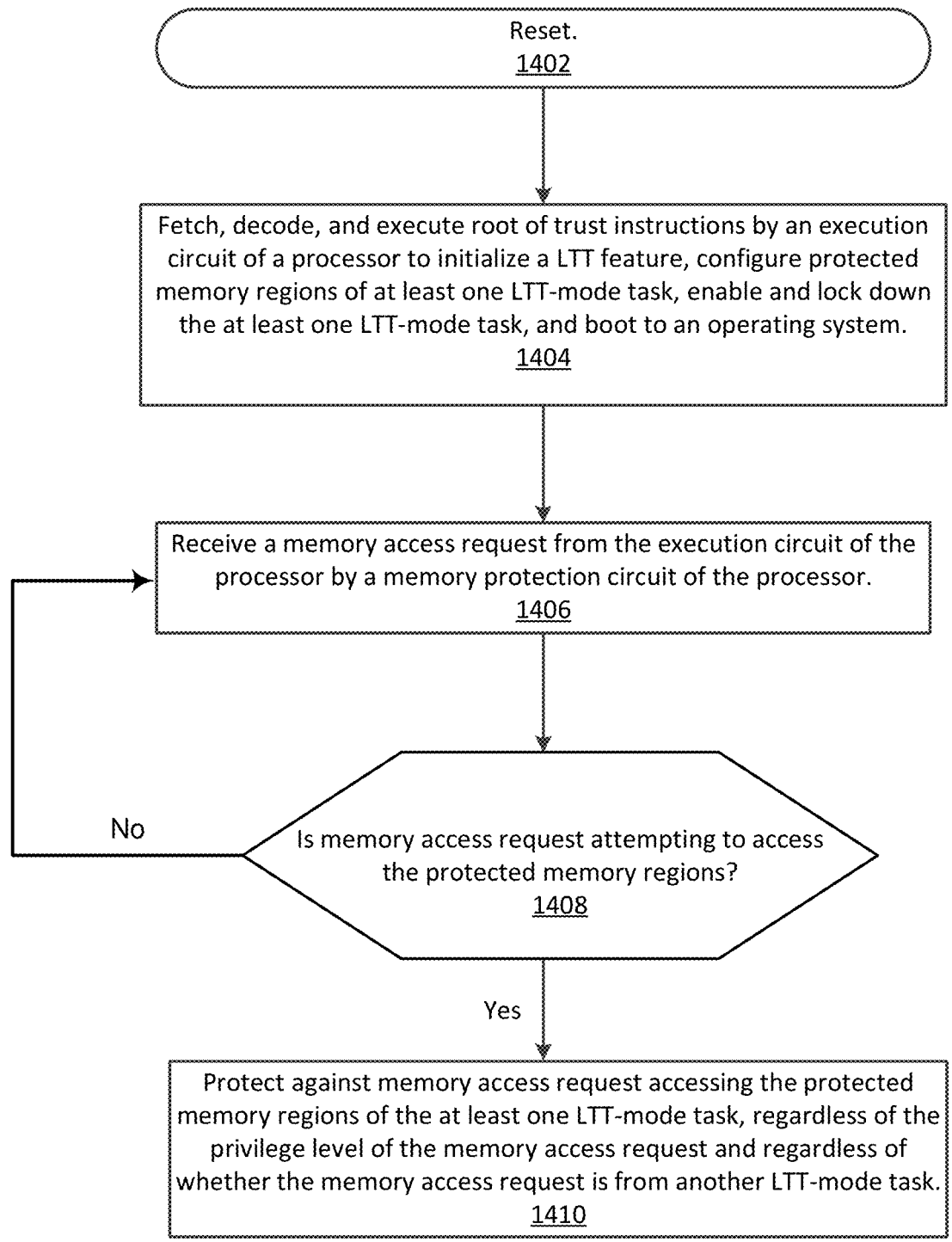
FIG. 14 is a flow diagram of an execution flow of a method of initializing and protecting a lightweight trusted task primitive after power-on, according to an embodiment.

FIG. 14 is a flow diagram of an execution flow for initializing and protecting a lightweight trusted task primitive after power-on, according to an embodiment. As illustrated, the execution flow is to be performed by a processor. At 1402, the processor is reset, which occurs, for example, after power-on. At 1404 firmware Root-of-Trust instructions are fetched, decoded, and executed by an execution circuit of the processor to initialize a LTT feature, configure protected memory regions of at least one LTT-mode task, enable and lock down the at least one LTT-mode task, and boot to an operating system. In some embodiments, the firmware instructions are stored in and loaded from a firmware read-only memory (firmware ROM), boot ROM, or other boot memory. At 1406 a memory access request is received from the execution circuit of the processor by a memory protection circuit of the processor. In some embodiments, the received memory access request is generated by the execution circuit while executing code associated with another task. At 1408, the memory protection circuit determines whether the received memory access request is attempting to access the protected memory regions of the at least one LTT-mode task.

In some embodiments, in order to determine whether the received memory access request is attempting to access the protected memory regions of the at least one LTT-mode task, the memory protection circuit accesses a task state segment of the at least one LTT-mode task and compares the request address to addresses of the code, data, stack segments, the local descriptor table and the TSS of the at least one LTT-mode task. When the received memory access request is attempting to access the protected memory regions, at 1410, the memory protection circuit protects against the received memory access request accessing the protected memory regions of the at least one LTT-mode task, regardless of the privilege level of the received memory access request and regardless of whether the received memory access request is from another LTT-mode task. Thus, the protected memory regions of LTT-mode tasks are mutually exclusive, and are protected against accessing each other's protected memory regions. In some embodiments, the memory protection circuit protects against the attempt to access the protected memory region by generating a fault.

When the received memory access request is not attempting to access the protected memory regions, at 1410, the flow returns to 1406 to receive another memory access request from the execution circuit of the processor by a memory protection circuit of the processor.

The execution flow of FIG. 14 thus comprises one embodiment of initializing, enabling an LTT-mode task. The flow of FIG. 14 can also be used to initialize another task that is not a LTT-mode task. The execution flow of FIG. 14 further includes one embodiment of executing the LTT-mode task and the other task by a processor, while protecting the protected memory regions of the LTT-mode task from being accessed by the other task, regardless of the privilege level of the other task and regardless of whether the other task is also a LTT-mode task.

Figure 15:
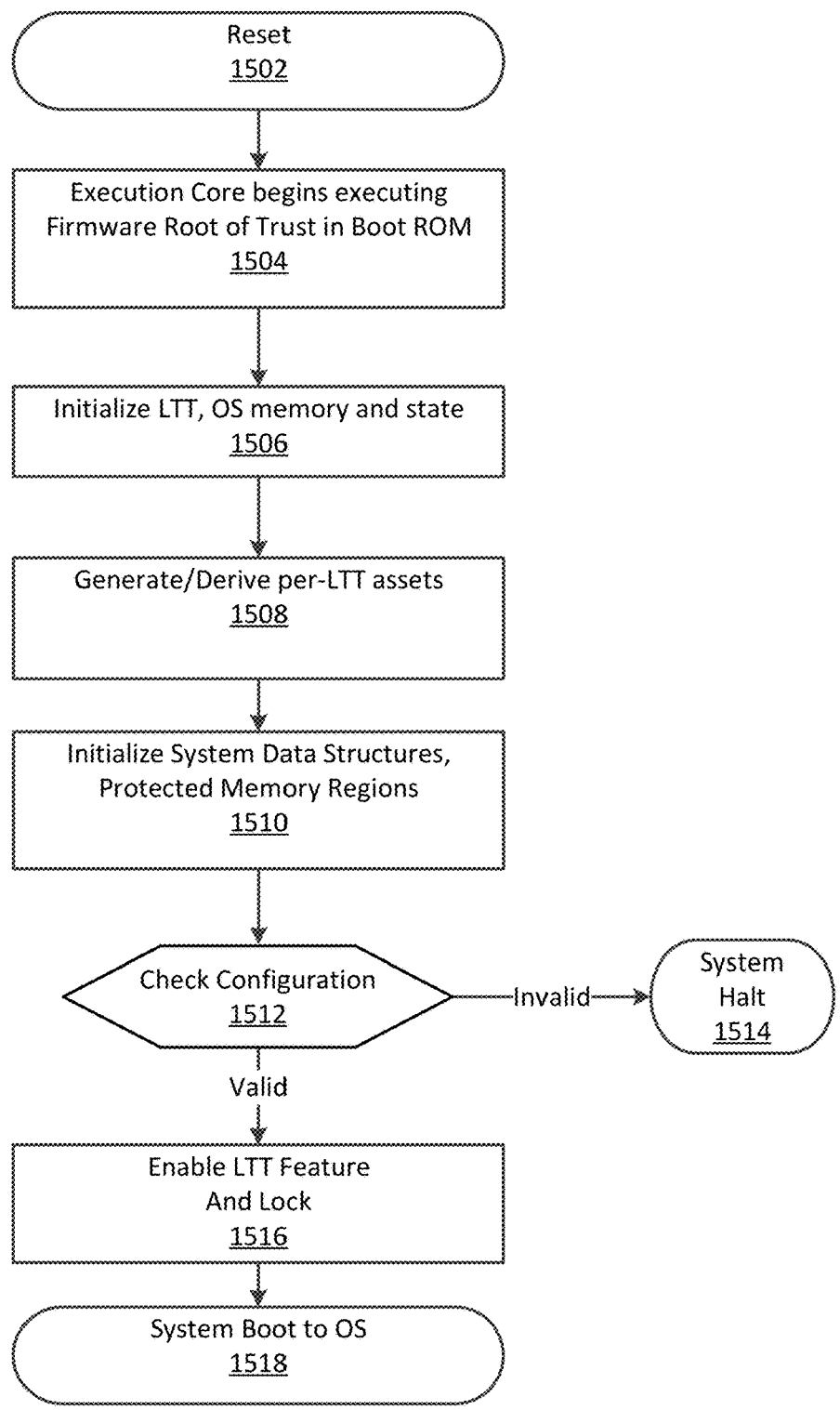
FIG. 15 is a flow diagram of an execution flow of a method of initializing a lightweight trusted task primitive after power-on, according to an embodiment.

FIG. 15 is a flow diagram of an execution flow of a Root-of-Trust method of initializing a lightweight trusted task primitive after power-on, according to an embodiment. After reset 1502, at 1504 the execution core begins executing firmware Root-of-Trust instructions stored in a boot ROM. At 1506, LTT data structures and operating system memory and state are initialized. At 1508, per-LTT assets are generated or derived. At 1510, system data structures and protected memory regions are initialized. At 1512, the configuration is checked to ensure that it is valid, and if it is invalid, the system halts at 1514. If the configuration is valid, at 1516 the LTT feature is enabled by setting the LTT enabled bit in the LTT control and status register, for example 600, described above. In conjunction with enabling the LTT feature at 1516, the LTT feature is locked by setting the lock bit in the LTT control and status register. At 1518, the LTT feature having been configured, the system boots to the operating system.

The execution flow of FIG. 15 thus comprises one embodiment of initializing and enabling a LTT-mode primitive by a processor.

Figure 16:
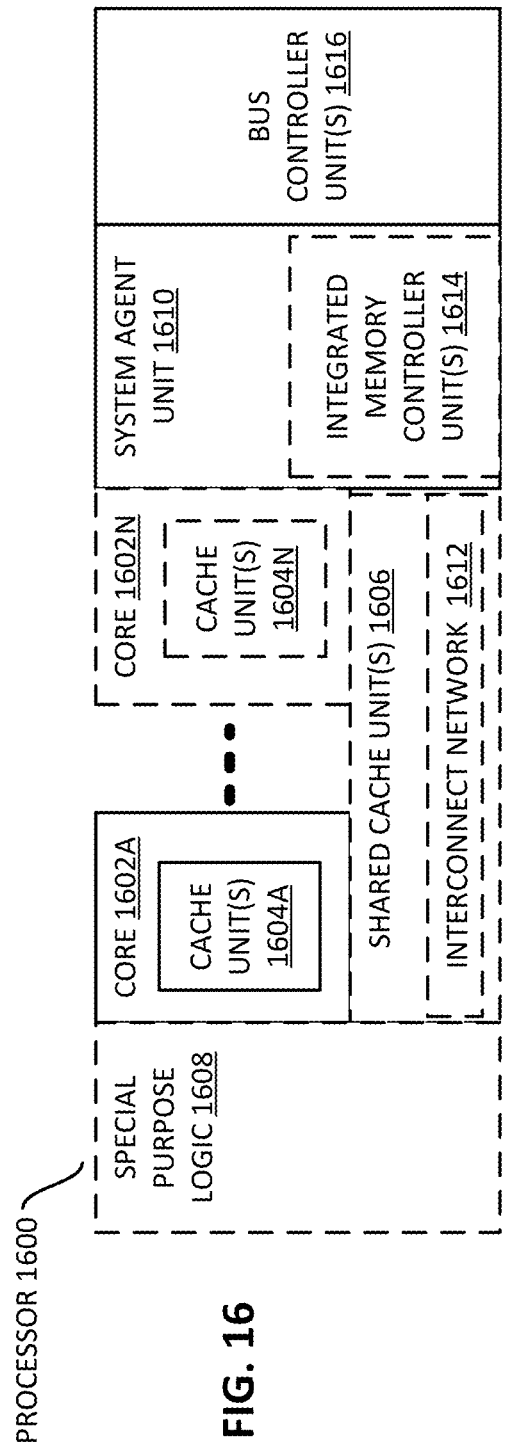
FIG. 16 is a block diagram of a processor 1600 that may have more than one core, may have an integrated memory controller, and may have integrated graphics according to embodiments disclosed herein.

FIG. 16 is a block diagram of a processor that may have more than one core, may have an integrated memory controller, and may have integrated graphics according to embodiments disclosed herein. The solid lined boxes in FIG. 16 illustrate a processor 1600 with a single core 1602A, a system agent unit 1610, a set of one or more bus controller unit(s) 1616, while the optional addition of the dashed lined boxes illustrates an alternative to processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, shared cache units 1606, and external memory (not shown) coupled to the set of integrated memory controller unit(s) 1614. The set of shared cache units 1606 may include one or more mid-level caches, such as level 2 (L2), level 3 (L3), level 4 (L4), or other levels of cache, a last level cache (LLC), and/or combinations thereof.

In some embodiments, processor 1600 uses tightly coupled memory on the same die, with no external cache and no external memory.

While in one embodiment a ring based interconnect unit 1612 interconnects special purpose logic 1608 (integrated graphics logic is an example of special purpose logic 1608), the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent unit 1610 includes those components coordinating and operating cores 1602A-N. The system agent unit 1610 may include for example a power control unit (PCU) and a display unit. The PCU may be or include logic and components needed for regulating the power state of the cores 1602A-N and the special purpose logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may can execute only a subset of that instruction set or a different instruction set.

Exemplary Register Architecture

FIG. 17 is a block diagram of a register architecture 1700 according to one embodiment. In the embodiment illustrated, there are 32 vector registers 1710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1715—in the embodiment illustrated, there are 8 write mask registers (k0 through k7), each 64 bits in size. In an alternate embodiment, the write mask registers 1715 are 16 bits in size. As previously described, in one embodiment disclosed herein, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Figure 18:
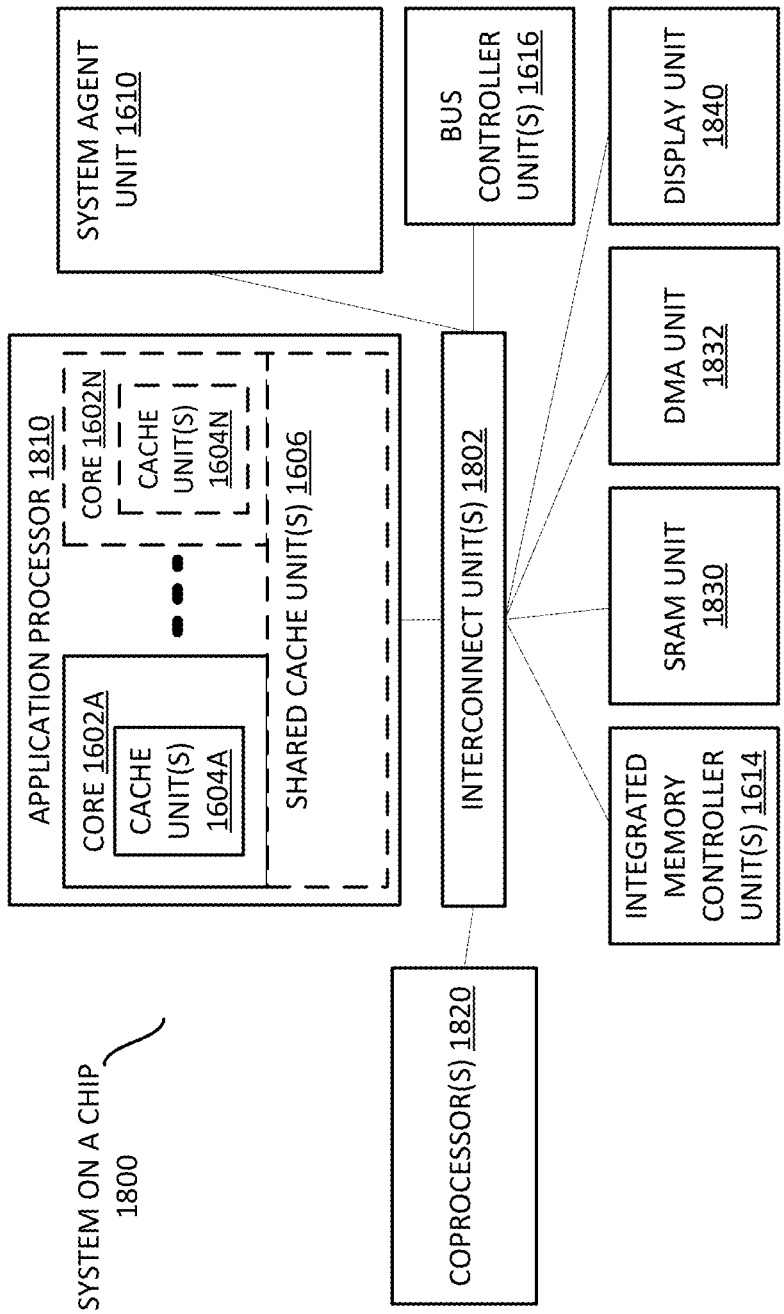
FIG. 18 is a block diagram of a SoC in accordance with an embodiment of the present invention.

Referring now to FIG. 18, shown is a block diagram of a SoC 1800 in accordance with an embodiment of the present invention. Similar elements in FIG. 16 bear like reference numerals. Also, dashed lined boxes are optional features on more advanced SoCs. In FIG. 18, an interconnect unit(s) 1802 is coupled to: an application processor 1810 which includes a set of one or more cores 1602A-N, which include cache units 1604A-N, and shared cache unit(s) 1606; a system agent unit 1610; a bus controller unit(s) 1616; an integrated memory controller unit(s) 1614; one or more coprocessor(s) 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments disclosed herein may be implemented as computer programs or program code executing on programmable systems including at least one processor, a storage system (including volatile and non-volatile memory and/or storage elements), at least one input device, and at least one output device.
Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
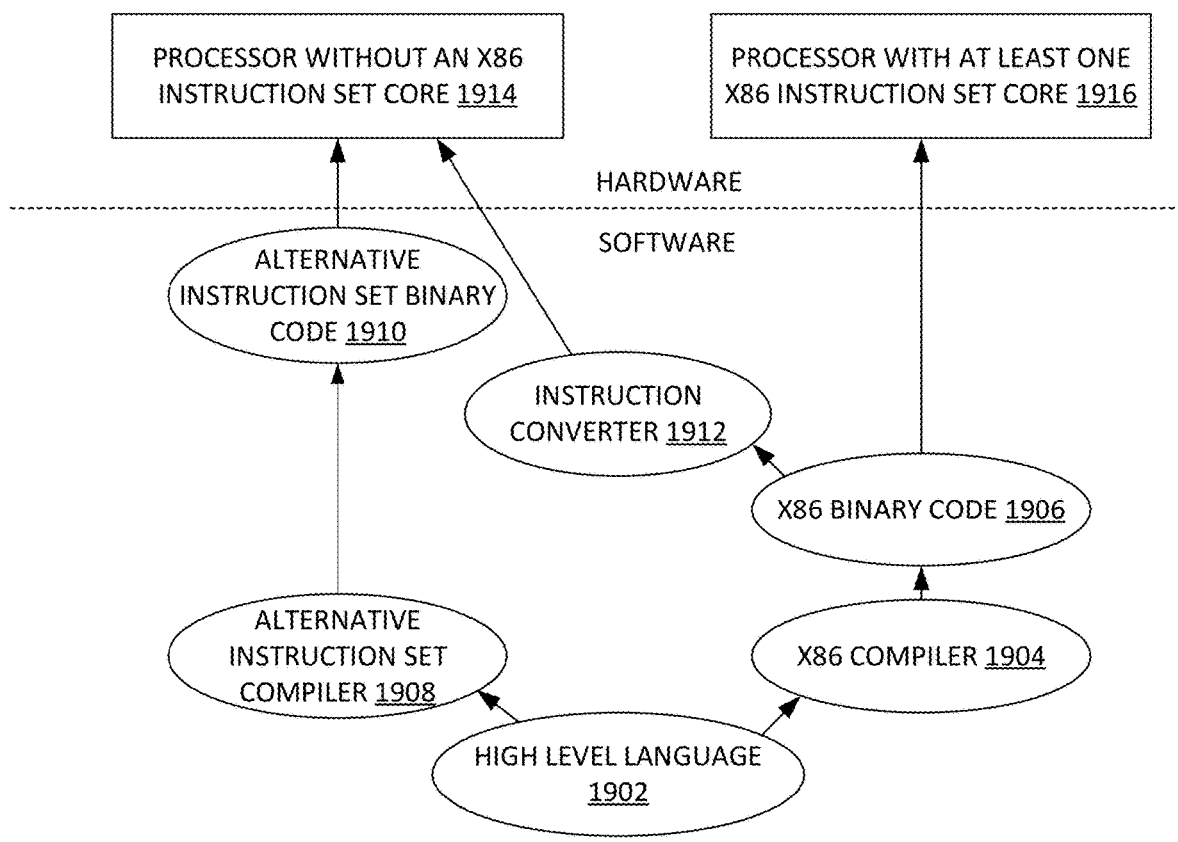
FIG. 19 is a block diagram contrasting the use of a software instruction converter to convert binary instructions in a source instruction set to binary instructions in a target instruction set according to embodiments disclosed herein.

FIG. 19 is a block diagram contrasting the use of a software instruction converter to convert binary instructions in a source instruction set to binary instructions in a target instruction set according to embodiments disclosed herein. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as a processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Alternative embodiments disclosed herein may use wider or narrower registers. Additionally, alternative embodiments disclosed herein may use more, less, or different register files and registers.

Figure 20:
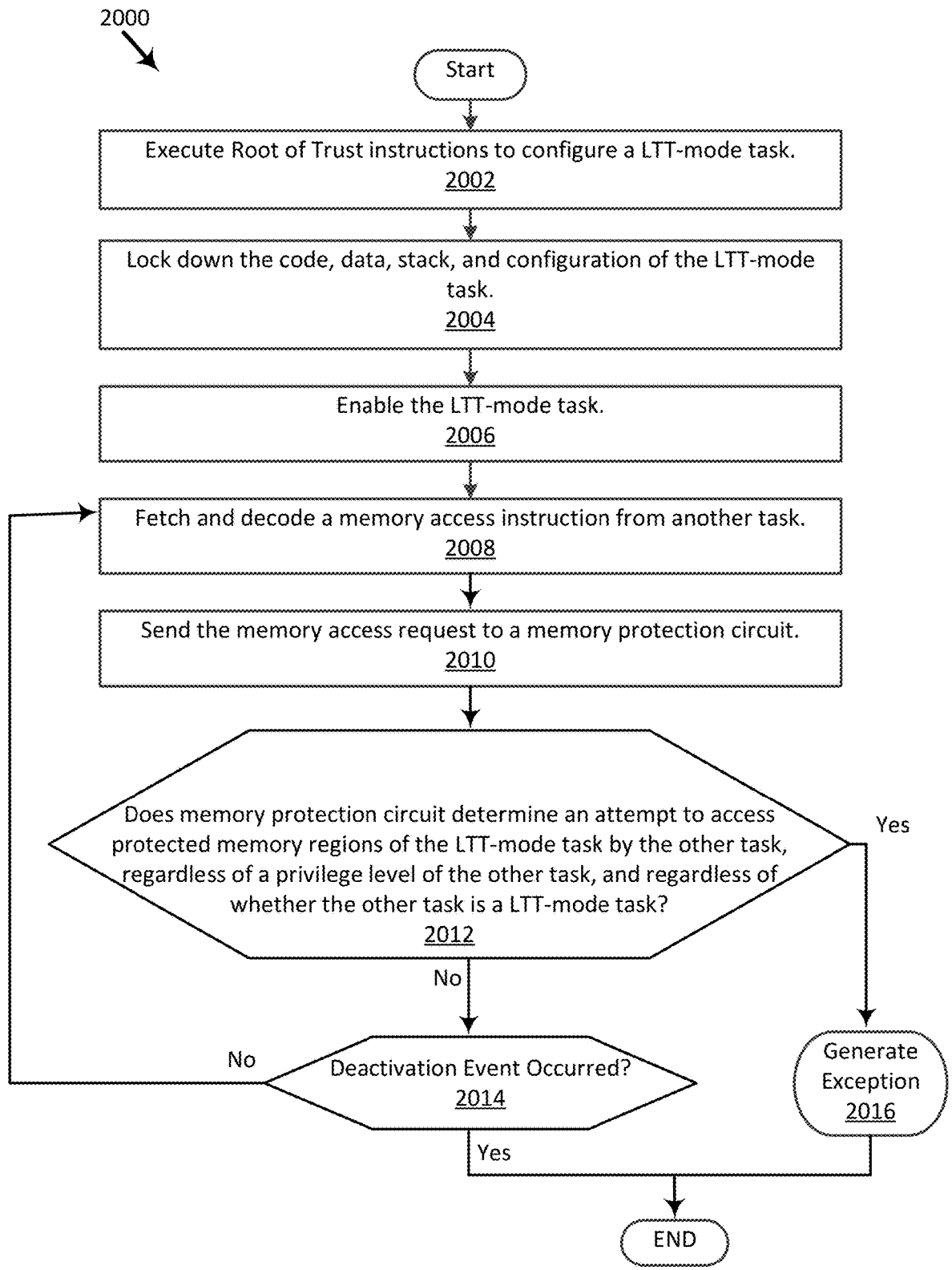
FIG. 20 is a flow diagram of an execution flow for method of configuring, locking down, and executing a lightweight trusted task (LTT) according to an embodiment.

FIG. 20 is a flow diagram of an execution flow for configuring, locking down, and executing a lightweight trusted task (LTT) according to an embodiment. In the illustrated embodiment, the flow is to be executed by an execution circuit of a processor, except that 2012 and 2016 are to be executed by a memory protection circuit of the processor. At 2002, Root-of-Trust instructions are executed to configure a LTT-mode task. Configuring the LTT-mode task at 2002 includes at least defining protected memory regions to include the LTT-mode tasks code, data, and stack segments, its local descriptor table, and its task state statement (TSS). In some embodiment, the Root-of-Trust instructions are stored in and fetched from a boot ROM. In some embodiments, 2002 is executed during a boot sequence. In some embodiments, the Root-of-Trust instructions are to be executed by an execution unit of the processor operating in a protected mode and at a Ring 0 privilege level. At 2004, the code, data, stack, and configuration of the LTT-mode task are locked down. At 2006, the LTT-mode task is enabled. At 2008, a memory access instruction from another task is fetched and decoded by the execution unit of the processor. At 2010, the execution unit of the processor is to send the memory access request to a memory protection circuit. At 2012, the memory protection circuit determines whether the memory access request is attempting to access protected memory regions of the LTT-mode task, regardless of a privilege level of the other task, and regardless of whether the other task is also a LTT-mode task If so, the memory protection circuit at 2016 is to generate a fault, and then the flow ends. If not, at 2014 it is determined whether a deactivation event occurred. A deactivation event in some embodiments is to occur when at least one of a machine check exception and an attempt to disable a previously enabled machine check architecture provided by the processor. When a deactivation event occurred, the flow ends. When a deactivation event has not occurred, the flow returns to 2008 to fetch and decode a memory access instruction from another task.

It is to be understood that the execution circuit of the processor executes many instructions unrelated to memory accesses, and that those instructions are not shown in FIG. 20. It is also to be understood that instructions associated with the LTT-mode task and instructions associated with an operating system are to be scheduled for execution concurrently.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments disclosed herein also include non-transitory, tangible machine-readable media containing instructions or containing design data, such as Hardware Description Language (HDL), which defines structures, circuits, apparatuses, processors and/or system features described herein. Such embodiments may also be referred to as program products.

FURTHER EXAMPLES

Example 1 provides a processor including: a memory interface to a memory to store code, data, and stack segments for at least one lightweight-trusted task (LTT) mode task and another task, a LTT control and status register including a readable/writeable lock bit to lock down the configuration of the at least one LTT-mode task, a processor core to enable LTT-mode, configure the at least one LTT-mode task, and lock down the configuration of the at least one LTT-mode task by writing the lock bit, and a memory protection circuit to: receive at least one memory access request from the memory interface, the at least one memory access request being associated with other task, determine whether the at least one memory access request from the other task is attempting to access a protected memory region associated with the at least one LTT-mode task, and protect against the at least one memory access request from the other task accessing the protected memory region of the at least one LTT-mode task, regardless of a privilege level of the other task, and regardless of whether the other task is also a LTT-mode task.

Example 2 includes the substance of Example 1, wherein the LTT control and status register further include a readable LTT active bit to be set by the processor when the LTT-mode is active, and a readable/writeable LTT enable to be written by the processor to enable LTT-mode.

Example 3 includes the substance of any one of Examples 1 to 2, wherein the protected memory region of the at least one LTT-mode task includes at least code, data, and stack segments, a local descriptor table, and a task state segment (TSS) associated with the at least one LTT-mode task.

Example 4 includes the substance of Example 3, wherein the memory protection circuit is further to continue receiving memory access requests from the memory interface and protecting against any of the received memory access requests accessing the protected memory region of the at least one LTT-mode task until an occurrence of a deactivation event, the deactivation event including one of a machine check exception and an attempt to disable a previously enabled machine check architecture provided by the processor.

Example 5 includes the substance of any one of Examples 3 to 4, wherein the processor further includes memory management circuitry to define and isolate a protected memory region including the code, data, and stack segments, the local descriptor table, and the task state segment (TSS) of the at least one LTT-mode task.

Example 6 includes the substance of any one of Examples 3 to 5, further including task management circuitry to associate the TSS with the at least one LTT-mode task, and to store contextual state information in the TSS before suspending the at least one LTT-mode task, and to recall contextual state information from the TSS upon restoring the task, the TSS further to include a LTT-mode bit to indicate that the at least one LTT-mode task is a LTT-mode task, and a LTT debug bit to indicate whether the at least one LTT-mode task is to opt in to a debug facility of the processor.

Example 7 includes the substance of Example 1, wherein the memory management circuitry further includes a TSS register to contain a base address of a TSS data structure of a currently-executing task.

Example 8 includes the substance of any one of Examples 3 to 6, wherein the TSS is a 32-bit mode data structure including 104 bytes, and wherein the processor is to trigger an exception and to generate a fault upon an occurrence of any one of the LTT-mode being enabled and a TSS being encountered that has fewer bytes than expected, a VM-8086 task being encountered, and a LTT-mode task being encountered when the LTT-mode is enabled but inactive.

Example 9 includes the substance of any one of Examples 1 to 8, wherein the LTT-mode, when enabled and active, is to cause the processor to raise an exception upon an occurrence of at least one of: an attempt to switch out of a protected mode of operation, an attempt to enable or disable a non-eviction mode of a CPU cache, an attempt to relocate a device residing within a CPU boundary using a device relocation capability, and an attempt to execute at least one of LGDT, LIDT, LLDT, LTR, INVD, sysenter, and sysexit instruction.

Example 10 provides a system including: a memory to store code, data, and stack segments for at least one LTT-mode task and another task, a LTT control and status register including a readable/writeable lock bit to lock down the configuration of the at least one LTT-mode task, and a processor core to enable LTT-mode, configure the at least one LTT-mode task, and lock down the configuration of the at least one LTT-mode task by writing the lock bit, the processor core including a memory protection circuit to: receive at least one memory access request from the memory, the at least one memory access request being associated with the other task, determine whether the at least one memory access request is attempting to access a protected memory region associated with the at least one LTT-mode task, and protect against the at least one memory access request accessing the protected memory region of the at least one LTT-mode task, regardless of a privilege level of the other task, and regardless of whether the other task is a LTT-mode task.

Example 11 includes the substance of Example 10, wherein the protected memory region of the at least one LTT-mode task includes at least code, data, and stack segments, a local descriptor table, and a task state segment (TSS) associated with the at least one LTT-mode task.

Example 12 includes the substance of any one of Examples 10 to 11, wherein the memory protection circuit is further to continue receiving memory access requests from the execution circuit of the processor and protecting against any of the received memory access requests from the other task accessing the protected memory region associated with the at least one LTT-mode task until an occurrence of a deactivation event, the deactivation event including one of a machine check exception and an attempt to disable a previously enabled machine check architecture provided by the processor.

Example 13 includes the substance of any one of Examples 10 to 12, wherein the processor includes a 32-bit mode task state segment (TSS) including 104 bytes, and wherein the processor is to trigger an exception and to generate a fault upon an occurrence of any one of the LTT-mode being enabled and a TSS being encountered that has fewer bytes than expected, a VM-8086 task being encountered, and a LTT-mode task being encountered when the LTT-mode is enabled but inactive.

Example 14 includes the substance of any one of Examples 10 to 13, wherein the processor further includes memory management circuitry to isolate individual protected memory regions, and wherein the processor is to use the memory management circuitry to define a protected memory region including the code, data, and stack segments, a local descriptor table, and a TSS of the at least one LTT-mode task.

Example 15 includes the substance of any one of Examples 10 to 14, the system further including a plurality of functional units, wherein the plurality of functional units and the processor core are integrated on a same die.

Example 16 provides a method of executing a lightweight trusted task (LTT) mode task in a system including a memory, a processor, and a memory protection circuit, the method including: resetting the system, fetching, decoding, and executing Root-of-Trust instructions from a firmware memory by an execution circuit of the processor to initialize a LTT feature, configure protected memory regions of at least one LTT-mode task, enable and lock down the at least one LTT-mode task, and boot to an operating system, and receiving, after booting to the operating system, at least one memory access request from the execution circuit by a memory protection circuit, the memory protection circuit to protect against the at least one memory access request accessing the protected memory regions of the at least one LTT-mode task, regardless of a privilege level of the at least one memory access request, and regardless of whether the at least one memory access request is from another LTT-mode task.

Example 17 includes the substance of Example 16, wherein the Root-of-Trust instructions, when executed by the execution circuit of the processor, cause the processor, to: begin executing firmware Root-of-Trust instructions fetched from a boot memory, initialize system memory and state associated with an operating system and an LTT feature, generate per-LTT-mode task assets, initialize system data structures and protected memory regions, check for any errors, when the check for errors yields an error, generate a system fault, and when the check for errors does not yield any errors, lock down a configuration of the LTT feature, enable the LTT feature, and lock down a configuration of at least one LTT-mode task, and boot the processor to the operating system.

Example 18 includes the substance of any one of Examples 16 to 17, wherein the execution circuit of the processor, after booting to the operating system, is to schedule instructions associated with the LTT-mode task and instructions associated with an operating system concurrently.

Example 19 includes the substance of any one of Examples 16 to 18, wherein the at least one LTT-mode task remains enabled until an occurrence of a deactivation event, wherein the processor is to provide a machine check architecture and wherein the deactivation event is to include at least one of a machine check exception and an attempt to disable a previously enabled machine check architecture.

Example 20 includes the substance of any one of Examples 16 to 19, wherein the processor is further to include a programmable base register and a programmable mask range specific register to define each protected memory region.

Example 21 includes the substance of Example 16 to 20, wherein the processor is further to include a LTT control and status register that includes a readable LTT active bit to be set by the processor when the LTT-mode is active, a readable/writeable LTT enable to be written by the processor to enable LTT-mode, and an LTT lock bit to lock down the LTT configuration.

Example 22 provides an article of manufacture including a non-transitory machine-readable storage medium, the non-transitory machine-readable storage medium storing instructions to execute, by a processor, a lightweight trusted task (LTT) mode task in a system including a memory, the processor, and a memory protection circuit, wherein the processor is to: reset the system, fetch, decode, and execute Root-of-Trust instructions from a firmware memory by an execution circuit of the processor to initialize a LTT feature, configure protected memory regions of at least one LTT-mode task, enable and lock down the at least one LTT-mode task, and boot to an operating system, and receive, after booting to the operating system, at least one memory access request from the execution circuit by a memory protection circuit, the memory protection circuit to protect against the at least one memory access request accessing the protected memory regions of the at least one LTT-mode task, regardless of a privilege level of the at least one memory access request, and regardless of whether the at least one memory access request is from another LTT-mode task.

Example 23 includes the substance of Example 22, wherein the Root-of-Trust instructions, when executed by the execution circuit of the processor, cause the processor, to: begin executing firmware Root-of-Trust instructions fetched from a boot memory, initialize system memory and state associated with an operating system and an LTT feature, generate per-LTT-mode task assets, initialize system data structures and protected memory regions, check for any errors, when the check for errors yields an error, generate a system fault, when the check for errors does not yield any errors, lock down a configuration of the LTT feature, enable the LTT feature, and lock down a configuration of at least one LTT-mode task, and boot the processor to the operating system.

Example 24 includes the substance of Example 23, wherein the execution circuit of the processor, after booting to the operating system, is to schedule instructions associated with the LTT-mode task and instructions associated with an operating system concurrently.

Example 25 includes the substance of any one of Examples 22 to 24, wherein the at least one LTT-mode task remains enabled until an occurrence of a deactivation event, wherein the processor is to provide a machine check architecture and wherein the deactivation event is to include at least one of a machine check exception and an attempt to disable a previously enabled machine check architecture.

Example 26 provides a method of executing a lightweight trusted task (LTT) mode task in a system including a memory, a processor, and a memory protection circuit, the method including: steps for initializing at least one LTT-mode task and at least one other task, steps for enabling the at least one LTT-mode task and the at least one other task, steps for executing the LTT-mode task and the at least one other task by the processor, while protecting the protected memory regions of the LTT-mode task from being accessed by the at least one other task, regardless of the privilege level of the other task and regardless of whether the other task is also a LTT-mode task.

Example 27 provides a processor including: a memory to store code, data, and stack segments for at least one lightweight-trusted task (LTT) mode task and at least one other task, an execution circuit to enable LTT-mode, configure the at least one LTT-mode task, and lock down the configuration of the at least one LTT-mode task, and a memory protection circuit to: receive at least one memory access request from the execution circuit, the at least one memory access request being generated by another task, determine whether the at least one memory access request from the other task is attempting to access a protected memory region associated with the at least one LTT-mode task, and protect against the at least one memory access request from the other task accessing the protected memory region of the at least one LTT-mode task, regardless of a privilege level of the other task, and regardless of whether the other task is also a LTT-mode task.

Example 28 includes the substance of Example 27, wherein the processor is further to include a LTT control and status model-specific register (MSR) that is to include a readable LTT active bit, which is to be set by the processor when the LTT-mode is active, and readable/writeable LTT enable and LTT lock bits, which are to be written by the processor to enable LTT-mode and to lock down the configuration of the at least one LTT-mode task.

Example 29 includes the substance of Example 27, wherein the protected memory region of the at least one LTT-mode task includes at least code, data, and stack segments, a local descriptor table, and a task state segment (TSS) associated with the at least one LTT-mode task.

Example 30 includes the substance of Example 29, wherein the memory protection circuit is further to continue receiving memory access requests from the execution circuit of the processor and protecting against any of the received memory access requests accessing the protected memory region of the at least one LTT-mode task until an occurrence of a deactivation event, the deactivation event including one of a machine check exception and an attempt to disable a previously enabled machine check architecture provided by the processor.

Example 31 includes the substance of Example 30, wherein the processor further includes task management circuitry to associate the TSS with the at least one LTT-mode task, and to store contextual state information in the TSS before suspending the at least one LTT-mode task, and to recall contextual state information from the TSS upon restoring the task, the TSS further to include a LTT-mode bit to indicate that the at least one LTT-mode task is a LTT-mode task, and a LTT debug bit to indicate whether the at least one LTT-mode task is to opt in to a debug facility of the processor.

Example 32 includes the substance of Example 31, wherein the memory management circuitry further includes a TSS data structure to contain a base address of a TSS of a currently-executing task.

Example 33 includes the substance of Example 32, wherein the TSS is a 32-bit mode data structure including 104 bytes, and wherein the processor is to trigger an exception and to generate a fault upon an occurrence of any one of the LTT-mode being enabled and a TSS being encountered that has fewer bytes than expected, a VM-8086 task being encountered, and a LTT-mode task being encountered when the LTT-mode is enabled but inactive.

Example 34 includes the substance of Example 33, wherein the LTT-mode, when enabled and active, is to cause the processor to raise an exception upon an occurrence of at least one of: an attempt to switch out of an protected mode of operation, an attempt to enable or disable a non-eviction mode of a CPU cache, an attempt to relocate a device residing within a CPU boundary using a device relocation capability, and an attempt to execute at least one of LGDT, LIDT, LLDT, LTR, INVD, sysenter, and sysexit instruction.

Although some embodiments disclosed herein involve data handling and distribution in the context of hardware execution circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the embodiment. Embodiments disclosed herein are provided as a computer program product or software which includes a machine or computer-readable medium having stored thereon instructions which are used to program a computer (or other electronic devices) to perform one or more operations according to the at least one embodiment. Alternatively, some embodiments are performed by specific hardware components that contain fixed-function logic for performing the embodiment, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A processor comprising:
   a memory interface to a memory to store code, data, and stack segments for at least one lightweight-trusted mode task (LTT-mode task) and another task;
   a LTT control and status register comprising a readable/writeable lock bit to lock down a configuration of the at least one LTT-mode task;
   a processor core to enable LTT-mode, configure the at least one LTT-mode task, and lock down the configuration of the at least one LTT-mode task by writing the lock bit; and
   a memory protection circuit to:
      receive at least one memory access request from the memory interface, the at least one memory access request being associated with the other task;
      determine whether the at least one memory access request from the other task is attempting to access a protected memory region associated with the at least one LTT-mode task; and
      protect against the at least one memory access request from the other task accessing the protected memory region of the at least one LTT-mode task, regardless of a privilege level of the other task, and regardless of whether the other task is also a LTT-mode task, the protected memory region comprising code, data, and stack segments, a local descriptor table, and a task state segment (TSS) associated with the LTT-mode task; and wherein the memory protection circuit is to continue protecting against any received memory access requests from the other task accessing the protected memory region until an occurrence of a deactivation event comprising one of a machine check exception and an attempt to disable a previously enabled machine check architecture of the processor.

2. The processor of claim 1, wherein the memory protection circuit is further to continue receiving memory access requests from the memory interface and protecting against any of the received memory access requests accessing the protected memory region of the at least one LTT-mode task until an occurrence of a deactivation event, the deactivation event comprising one of a machine check exception and an attempt to disable a previously enabled machine check architecture provided by the processor.

3. The processor of claim 1, wherein the processor further comprises memory management circuitry to define and isolate a protected memory region comprising the code, data, and stack segments, the local descriptor table, and the task state segment (TSS) of the at least one LTT-mode task.

4. The processor of claim 3, further comprising task management circuitry to associate the TSS with the at least one LTT-mode task, and to store contextual state information in the TSS before suspending the at least one LTT-mode task, and to recall contextual state information from the TSS upon restoring the task, the TSS further to comprise a LTT-mode bit to indicate that the at least one LTT-mode task is a LTT-mode task, and a LTT debug bit to indicate whether the at least one LTT-mode task is to opt in to a debug facility of the processor.

5. The processor of claim 4, wherein the memory management circuitry further comprises a TSS register to contain a base address of a TSS data structure of a currently-executing task.

6. The processor of claim 4,
   wherein the TSS is a 32-bit mode data structure comprising 104 bytes; and
   wherein the processor is to trigger an exception and to generate a fault upon an occurrence of any one of the LTT-mode being enabled and a TSS being encountered that has fewer bytes than expected, a VM-8086 task being encountered, and a LTT-mode task being encountered when the LTT-mode is enabled but inactive.

7. The processor of claim 6, wherein the LTT-mode, when enabled and active, is to cause the processor to raise an exception upon an occurrence of at least one of: an attempt to switch out of a protected mode of operation, an attempt to enable or disable a non-eviction mode of a CPU cache, an attempt to relocate a device residing within a CPU boundary using a device relocation capability, and an attempt to execute at least one of LGDT, LIDT, LLDT, LTR, INVD, sysenter, and sysexit instruction.

8. A system comprising:
   a memory to store code, data, and stack segments for at least one LTT-mode task and another task;
   a LTT control and status register comprising a readable/writeable lock bit to lock down a configuration of the at least one LTT-mode task; and
   a processor core to enable LTT-mode, configure the at least one LTT-mode task, and lock down the configuration of the at least one LTT-mode task by writing the lock bit, the processor core comprising a memory protection circuit to:
      receive at least one memory access request from the memory, the at least one memory access request being associated with the other task;
      determine whether the at least one memory access request is attempting to access a protected memory region associated with the at least one LTT-mode task; and
      protect against the at least one memory access request accessing the protected memory region of the at least one LTT-mode task, regardless of a privilege level of the other task, and regardless of whether the other task is a LTT-mode task, the protected memory region comprising at least code, data, and stack segments, a local descriptor table, and a task state segment (TSS) associated with the LTT-mode task; and wherein the memory protection circuit is further to continue receiving memory access requests from the memory and protecting against any of the received memory access requests from the other task accessing the protected memory region associated with the LTT-mode task until an occurrence of a deactivation event, the deactivation event comprising one of a machine check exception and an attempt to disable a previously enabled machine check architecture provided by the processor.

9. The system of claim 8,
wherein the processor includes a 32-bit mode task state segment (TSS) comprising 104 bytes; and
wherein the processor is to trigger an exception and to generate a fault upon an occurrence of any one of the LTT-mode being enabled and a TSS being encountered that has fewer bytes than expected, a VM-8086 task being encountered, and a LTT-mode task being encountered when the LTT-mode is enabled but inactive.

10. The system of claim 9, wherein the processor further comprises memory management circuitry to isolate individual protected memory regions, and wherein the processor is to use the memory management circuitry to define a protected memory region comprising the code, data, and stack segments, a local descriptor table, and a TSS of the at least one LTT-mode task.

11. The system of claim 8, the system further comprising a plurality of functional units, wherein the plurality of functional units and the processor core are integrated on a same die.

12. A method of executing a lightweight trusted task (LTT) mode task in a system comprising a memory, a processor, and a memory protection circuit, the method comprising:
resetting the system;
fetching, decoding, and executing Root-of-Trust instructions from a firmware memory by an execution circuit of the processor to initialize a LTT feature, configure protected memory regions of at least one LTT-mode task, enable and lock down the at least one LTT-mode task, and boot to an operating system; and
receiving, after booting to the operating system, at least one memory access request from the execution circuit by a memory protection circuit, the memory protection circuit to protect against the at least one memory access request accessing the protected memory regions of the at least one LTT-mode task, regardless of a privilege level of the at least one memory access request, and regardless of whether the at least one memory access request is from another LTT-mode task, wherein the Root-of-Trust instructions, when executed by the execution circuit of the processor, cause the processor, to:
begin executing firmware Root-of-Trust instructions fetched from a boot memory;
initialize system memory and state associated with an operating system and an LTT feature;
generate per-LTT-mode task assets;
initialize system data structures and protected memory regions;
check for any errors;
when the check for errors yields an error, generate a system fault;
when the check for errors does not yield any errors, lock down a configuration of the LTT feature, enable the LTT feature, and lock down a configuration of a LTT-mode task; and
boot the processor to the operating system.

13. The method of claim 12, wherein the execution circuit of the processor, after booting to the operating system, is to schedule instructions associated with the LTT-mode task and instructions associated with an operating system concurrently.

14. The method of claim 12, wherein the at least one LTT-mode task remains enabled until an occurrence of a deactivation event, wherein the processor is to provide a machine check architecture and wherein the deactivation event is to comprise at least one of a machine check exception and an attempt to disable a previously enabled machine check architecture.

15. The method of claim 12, wherein the processor is further to comprise a programmable base register and a programmable mask range register to define each protected memory region.

16. The method of claim 12, wherein the processor is further to comprise a LTT control and status register that comprises a readable LTT active bit to be set by the processor when the LTT-mode is active, a readable/writeable LTT enable to be written by the processor to enable LTT-mode, and an LTT lock bit to lock down the LTT configuration.

* * * * *